(12) United States Patent
Sakamoto et al.

(10) Patent No.: US 11,251,418 B2
(45) Date of Patent: Feb. 15, 2022

(54) METHOD FOR MANUFACTURING SLURRY FOR POSITIVE ELECTRODE OF NONAQUEOUS ELECTROLYTE SECONDARY BATTERY AND SLURRY FOR POSITIVE ELECTRODE OF NONAQUEOUS ELECTROLYTE SECONDARY BATTERY

(71) Applicants: NIHON SPINDLE MANUFACTURING CO., LTD., Hyogo (JP); NATIONAL INSTITUTE OF ADVANCED INDUSTRIAL SCIENCE AND TECHNOLOGY, Tokyo (JP)

(72) Inventors: Taichi Sakamoto, Osaka (JP); Takashi Mukai, Osaka (JP); Yuta Ikeuchi, Osaka (JP); Naoto Yamashita, Osaka (JP); Masahiro Yanagida, Osaka (JP); Keiichi Asami, Hyogo (JP); Keiichiro Onishi, Hyogo (JP)

(73) Assignees: NIHON SPINDLE MANUFACTURING CO., LTD., Hyogo (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 15/900,559

(22) Filed: Feb. 20, 2018

(65) Prior Publication Data
US 2018/0183047 A1 Jun. 28, 2018

Related U.S. Application Data

(63) Continuation of application No. PCT/JP2016/081588, filed on Oct. 25, 2016.

(30) Foreign Application Priority Data

Feb. 8, 2016 (JP) .............................. JP2016-021860

(51) Int. Cl.
*H01M 4/131* (2010.01)
*H01M 4/1391* (2010.01)
(Continued)

(52) U.S. Cl.
CPC ........... *H01M 4/1391* (2013.01); *C01B 25/45* (2013.01); *C01G 45/1242* (2013.01);
(Continued)

(58) Field of Classification Search
CPC ..... H01B 1/08; H01B 1/14; H01B 1/18; H01B 1/20; H01B 1/24; C01G 45/1242;
(Continued)

(56) References Cited

U.S. PATENT DOCUMENTS 6,200,703 B1    3/2001  Kashio et al.
7,267,529 B2 *  9/2007  Taylor ................ B01D 19/0036
                                                   415/169.1
(Continued)

FOREIGN PATENT DOCUMENTS

EP    1 760 821 A1      3/2007
JP    08069791 A  *     3/1996
(Continued)

OTHER PUBLICATIONS

English machine translation of Sugihara et al. JP 2012-138217 A (Year: 2012).*
(Continued)

Primary Examiner — Matthew R Diaz
(74) Attorney, Agent, or Firm — Michael Best & Friedrich LLP

(57) ABSTRACT

Provided is a method for manufacturing a slurry for a positive electrode of a nonaqueous electrolyte secondary battery containing an alkali metal complex oxide, the method making it possible to reliably deaerate surplus carbonic acid gas after an alkali component of a slurry
(Continued)

containing the alkali metal complex oxide is neutralized within a short period of time. The method for manufacturing a slurry for a positive electrode of a nonaqueous electrolyte secondary battery includes a step of manufacturing an electrode slurry including a step of performing a neutralization treatment on an alkali component in the slurry by using inorganic carbon dissolved in a solvent of the slurry and a step of deaerating the inorganic carbon in the slurry as carbonic acid gas by causing cavitation.

15 Claims, 10 Drawing Sheets

(51) Int. Cl.
| | |
|---|---|
| *H01M 10/0525* | (2010.01) |
| *H01M 4/62* | (2006.01) |
| *C01B 25/45* | (2006.01) |
| *C01G 45/12* | (2006.01) |
| *C01G 51/00* | (2006.01) |
| *C01G 53/00* | (2006.01) |
| *H01M 4/02* | (2006.01) |

(52) U.S. Cl.
CPC ............. *C01G 51/42* (2013.01); *C01G 53/42* (2013.01); *C01G 53/50* (2013.01); *C01G 53/54* (2013.01); *H01M 4/131* (2013.01); *H01M 4/625* (2013.01); *H01M 10/0525* (2013.01); *H01M 2004/028* (2013.01)

(58) Field of Classification Search
CPC ........ C01G 51/42; C01G 53/42; C01G 53/50; C01G 53/54; H01M 4/0404; H01M 4/131; H01M 4/136; H01M 4/1391; H01M 4/1397; H01M 4/625; H01M 10/0525; B01D 19/00; B01D 19/0073; B01D 19/0094; B01F 3/04099; B01F 3/04106; B01F 3/04439; B01F 3/04893; B01F 3/2223; B01F 2003/04893; C01B 25/45

See application file for complete search history.

(56) References Cited

U.S. PATENT DOCUMENTS

| | | | | |
|---|---|---|---|---|
| 7,726,325 | B2* | 6/2010 | Saiki | B01D 19/0052 134/184 |
| 8,530,082 | B2* | 9/2013 | Uchida | H01M 4/0404 429/209 |
| 9,413,013 | B2 | 8/2016 | Morikawa et al. | |
| 2008/0050295 | A1* | 2/2008 | Uchida | C22B 3/165 423/179.5 |
| 2011/0183211 | A1 | 7/2011 | Uchida et al. | |
| 2014/0241108 | A1* | 8/2014 | Stoppler | B01F 13/0032 366/137 |
| 2015/0034862 | A1 | 2/2015 | Kifune | |
| 2016/0248076 | A1* | 8/2016 | Sugihara | B01D 19/0036 |

FOREIGN PATENT DOCUMENTS

| | | | |
|---|---|---|---|
| JP | H09-180725 A | | 7/1997 |
| JP | 09316467 A | * | 12/1997 |
| JP | 3232910 B2 | | 11/2001 |
| JP | 2005026089 A | | 1/2005 |
| JP | 2008226515 A | * | 9/2008 |
| JP | 2011-146152 A | | 7/2011 |
| JP | 2012-003891 A | | 1/2012 |
| JP | 2012-138217 A | | 7/2012 |
| JP | 2012138217 A | * | 7/2012 |
| JP | 5158453 B2 | | 3/2013 |
| WO | WO-2012/090368 A1 | | 7/2012 |
| WO | WO-2013/136828 A1 | | 9/2013 |

OTHER PUBLICATIONS

English machine translation of Nakayama et al. JP 08-069791 A (Year: 1996).*
English machine translation of Hashimoto et al. JP 2008-226515 A (Year: 2008).*
English language machine translation of Kameda et al. (JP 09-316467 A). (Year: 1997).*
Rajasingam et al., "Solubility of carbon dioxide in dimethylsulfoxide and N-methyl-2-pyrrolidone at elevated pressure", Website https://www.sciencedirect.com/science/article/pii/S0896844603002948, The Journal of Supercritical Fluids, vol. 31, Issue 3, Nov. 2004, Accepted Dec. 12, 2003, pp. 227-234 (8 pages), Elsevier B. V., Netherlands.
Bohloul et al., Experimental and theoretical study of $CO_2$ solubility in N-methyl-2-pyrrolidone (NMP), Website https://www.sciencedirect.com/science/article/pii/S0378381213007486, Fluid Phase Equilibria, vol. 365, Mar. 15, 2014, pp. 106-111 (6 pages), Elsevier B. V., Netherlands.
International Search Report issued in Application No. PCT/JP2016/081588, dated Dec. 13, 2016.
Search report issued in European Application No. 16889893.0, dated Aug. 6, 2019.
Article 94(3) EPC Communication issued in European Application No. 16889893.0, dated May 8, 2020.

* cited by examiner

METHOD FOR MANUFACTURING SLURRY FOR POSITIVE ELECTRODE OF NONAQUEOUS ELECTROLYTE SECONDARY BATTERY AND SLURRY FOR POSITIVE ELECTRODE OF NONAQUEOUS ELECTROLYTE SECONDARY BATTERY

RELATED APPLICATIONS

Priority is claimed to Japanese Patent Application No. 2016-021860, filed Feb. 8, 2016, and International Patent Application No. PCT/JP2016/081588, the entire content of each of which is incorporated herein by reference.

BACKGROUND

Technical Field

Certain embodiments of the present invention relate to a method for manufacturing a slurry for a positive electrode of a nonaqueous electrolyte secondary battery and a slurry for a positive electrode of a nonaqueous electrolyte secondary battery.

Description of Related Art

A positive electrode and a negative electrode of a battery are prepared by coating a current collector with a slurry containing an active material, a binder, and carbon black which is added if necessary.

As a binder for a negative electrode, an aqueous binder represented by styrene-butadiene rubber (SBR) is mainly used. In contrast, as a binder for a positive electrode, because a butadiene component is vulnerable to oxidation degradation, a solvent-based binder based on polyvinylidene fluoride (PVDF) is used mainly in practical batteries.

Incidentally, in the PVDF-based binder used as the aforementioned binder for a positive electrode, as a solvent of the slurry, an organic solvent N-methyl pyrrolidone (NMP) is used, and hence the binder causes a big environmental load. Therefore, aqueous binders that cause a light environmental load are drawing attention.

In lithium complex oxides such as lithium cobaltate ($LiCoO_2$) or a ternary material ($LiNi_{0.33}Co_{0.33}Mn_{0.33}O_2$), lithium hydroxide remains as an unreacted synthetic substance, and this substance increases the pH level by coming into contact with water. A strong alkaline slurry with a pH level of higher than 11 corrodes an aluminum current collector at the time of coating and generates hydrogen gas in the interface between the active material layer and the aluminum current collector. Due to the hydrogen gas, the active material layer foams, and this leads to a decrease in electrode strength or the exfoliation or detachment of the active material layer. Furthermore, unfortunately, it is difficult to obtain a uniform electrode.

As a measure for the above problems, a surface coating method for preventing the active material layer from coming into contact with water or a method of using a stainless steel current collector having excellent alkali resistance has been developed.

In addition, as a method for preventing the corrosion of the aluminum current collector, there is a method of controlling the pH level of a slurry by neutralizing the slurry by the addition of an acid. In this case, the pH level needs to be within a range of 3 to 11 in which aluminum does not easily dissolve. However, in a case where an inorganic acid such as hydrochloric acid, nitric acid, sulfuric acid, or hydrofluoric acid is used as a neutralizer, sometimes the active material is dissolved at the time of adding the neutralizer. Furthermore, in a case where an excess of acid is injected, the pH level rapidly decreases. Therefore, unfortunately, it is difficult to control the pH level.

The related art describes that for solving the above problem, in addition to the aforementioned neutralizer, an organic acid is preferable. In a case where an organic acid such as formic acid, acetic acid, oxalic acid, or butyric acid is used as a neutralizer, the rapid decrease in the pH level resulting from the injection of an excess of an acid can be mitigated. Furthermore, in a step of drying the electrode, the organic acid is scattered by decomposition or evaporation, and consequently, it is possible to prevent the acid from remaining in the molded electrode.

The related art describes that in a case where the surfaces of positive electrode active material particles are coated with lithium carbonate, it is possible to inhibit an OH unit from being generated in the positive electrode active material particles, and the positive electrode active material particles coated with the lithium carbonate do not easily react with moisture.

The related art suggests a method for performing a neutralization treatment on a positive electrode active material by bringing a lithium-nickel complex oxide or a lithium-cobalt complex oxide into contact with an acidic gas-containing gas under dry conditions.

The related art suggests a method for manufacturing a positive electrode mixture, in which in a kneading step of kneading a lithium complex oxide with at least either a conductive auxiliary agent or a binder resin, kneading is performed in a carbonic acid gas (carbon dioxide) atmosphere.

The related art suggests a method for preparing a positive electrode plate by causing carbonic acid gas to flow in a paste obtained by kneading a positive electrode active material with a thickener such that the pH level of the paste becomes 7 to 11, then applying the paste to the surface of a current collector, and drying the paste.

The related art suggests a method for forming an intervening layer of an electrode by mixing microbubbles having a bubble diameter of equal to or smaller than 500 μm with an electrode mixture paste and coating a current collector of an electrode with the paste having reduced density.

Among these, particularly according to the methods described in the related art, because carbonic acid gas is used as a neutralizer, an acid does not remain as an impurity in the interior of a battery, and a nonconductive layer is not formed in the interface between the current collector and the active material layer. Therefore, the methods have an advantage in that the conductivity or the battery characteristics can be improved.

SUMMARY

According to an embodiment of the present invention, there is provided a method for manufacturing a slurry for a positive electrode of a nonaqueous electrolyte secondary battery containing an alkali metal complex oxide such as a lithium complex oxide. The method includes a step of manufacturing an electrode slurry, including a step of performing a neutralization treatment on an alkali component in the slurry by using inorganic carbon dissolved in a solvent of the slurry and a step of deaerating the inorganic carbon in the slurry as carbonic acid gas by causing cavitation.

According to another embodiment of the present invention, there is provided a slurry for a positive electrode of a nonaqueous electrolyte secondary battery containing an alkali metal complex oxide. The slurry includes a solvent containing water, and at least an alkali metal hydrogen carbonate is dissolved in the solvent.

DETAILED DESCRIPTION

Figure 1:
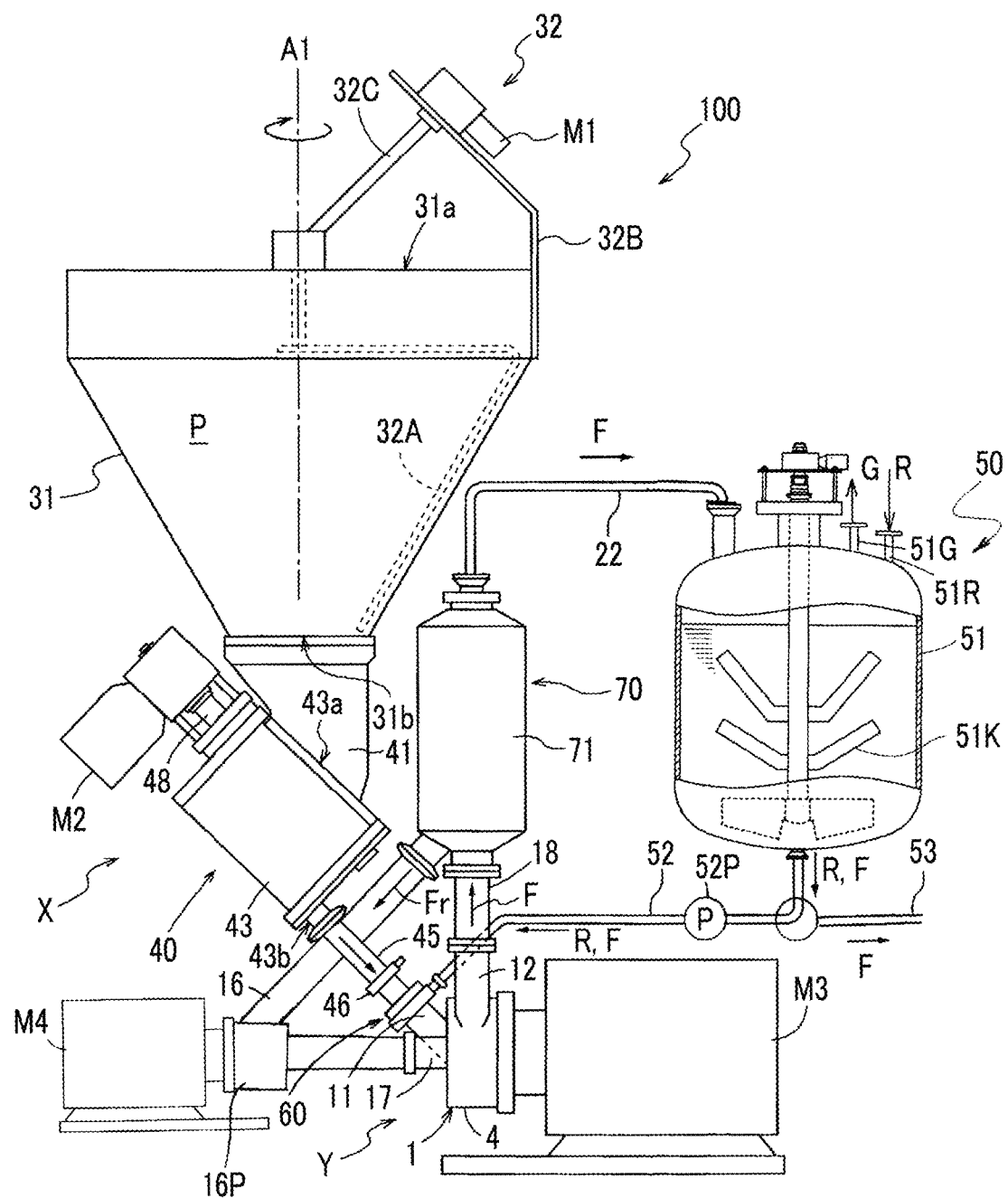
FIG. 1 is a view illustrating an example of a dispersing and mixing system including a dispersing and mixing pump used for manufacturing a slurry of the present invention.

The methods for preventing the corrosion of an aluminum current collector described in the related art have the following problems.

The method described in the related art has a problem in that a salt generated by neutralization has a large molecular weight, and the energy density of the electrode decreases.

The related art describes that in the method disclosed in the related art, in a case where the slurry neutralized using the aforementioned organic acid is used for coating, then dried, and used as a positive electrode active material layer in a battery, anions derived from the added acid may be eluted into the electrolytic solution of the battery, and hence the battery characteristics may deteriorate.

In the method described in the related art, the active material needs to be left to stand in the carbonic acid gas atmosphere for a long period of time, and the number of steps increases. Therefore, this method has a problem in that the manufacturing lead time increases. In the methods described in the related art, the slurry is kneaded in the carbonic acid gas atmosphere, or carbonic acid gas is caused to flow in the slurry. Accordingly, in these methods, the manufacturing lead time is shorter than that in the method described in the related art. However, even though 100% carbonic acid gas is used, in a carbonic acid gas atmosphere under normal pressure, only a small amount of carbonic acid gas dissolves in water, and the solubility of the gas in the solvent decreases due to the heat generated in the process of kneading the slurry. Therefore, a neutralization reaction occurs mainly by the contact between the active material (solid phase) and the carbonic acid gas (gas phase). Consequently, usually, it takes 1 hour or longer to finish the neutralization reaction, and the manufacturing lead time can be shortened only to a small extent.

The present invention has been made to solve the problems of the methods for preventing the corrosion of an aluminum current collector described in the related art described above. It is desirable to provide a method for manufacturing a slurry for a positive electrode of a nonaqueous electrolyte secondary battery and a slurry for a positive electrode of a nonaqueous electrolyte secondary battery that make it possible to reliably deaerate surplus carbonic acid gas after an alkali component of a slurry containing an alkali metal complex oxide is neutralized within a short period of time.

In this case, the method can include a step of dispersing or mixing solid contents of the slurry by causing cavitation.

In the step of performing a neutralization treatment on an alkali component in the slurry by using the inorganic carbon dissolved in a solvent of the slurry, the inorganic carbon dissolved in the solvent of the slurry is inorganic carbon generated by dissolving carbonic acid gas in the solvent of the slurry, and a pressure of the carbonic acid gas can be equal to or higher than 0.12 MPa and equal to or lower than 100 MPa, preferably equal to or higher than 0.2 MPa and equal to or lower than 50 MPa, and more preferably equal to or higher than 0.3 MPa and equal to or lower than 10 MPa.

By using the slurry for a positive electrode of a nonaqueous electrolyte secondary battery of the present invention, a positive electrode of a nonaqueous electrolyte secondary battery, specifically, a positive electrode of a nonaqueous electrolyte secondary battery coated with an alkali metal carbonate can be manufactured. By using the positive electrode, a nonaqueous electrolyte secondary battery can be manufactured. Furthermore, the nonaqueous electrolyte secondary battery can be suitably used in electronic devices.

According to the method for manufacturing a slurry for a positive electrode of a nonaqueous electrolyte secondary battery and the slurry for a positive electrode of a nonaqueous electrolyte secondary battery of the present invention, by using carbonic acid gas as a neutralizer, it is possible to reliably deaerate surplus carbonic acid gas after an alkali component in the slurry containing an alkali metal complex oxide is neutralized within a short period of time. Therefore, impurities do not remain in the interior of a battery, a nonconductive layer is not formed in the interface between a current collector and an active material layer, and it is possible to shorten the manufacturing lead time of a positive electrode of a nonaqueous electrolyte secondary battery that can improve the conductivity or the battery characteristics.

Hereinafter, embodiments of the method for manufacturing a slurry for a positive electrode of a nonaqueous electrolyte secondary battery and a slurry for a positive electrode of a nonaqueous electrolyte secondary battery of the present invention will be described.

Method for Manufacturing Slurry for Positive Electrode of Nonaqueous Electrolyte Secondary Battery While a hydroxide of an alkali metal contained in an alkali metal complex oxide easily dissolves in water, carbonic acid gas (carbon dioxide) as a neutralizer does not easily dissolve in water under normal pressure. For example, while lithium hydroxide contained in a lithium complex oxide easily dissolves in water, carbonic acid gas (carbon dioxide) as a neutralizer does not easily dissolve in water under normal pressure.

By the Henry's law, it is known that the amount of carbonic acid gas dissolving in a solvent is proportionate to the pressure. That is, in a case where carbonic acid gas is dissolved in a solvent in a pressurized state, the concentration of inorganic carbon (carbon dioxide, carbonic acid, carbonate ions, and bicarbonate ions) in the solvent can be increased.

A reaction rate is heavily dependent on the concentration of a reactant and the environmental temperature. Therefore, the higher the concentration of a reactant and the environmental temperature, the higher the rate of a chemical reaction.

The present invention is a method for manufacturing a slurry for a positive electrode of a nonaqueous electrolyte secondary battery containing an alkali metal complex oxide, and includes a step of manufacturing an electrode slurry, including a step of performing a neutralization treatment on an alkali component in the slurry by using inorganic carbon dissolved in a solvent of the slurry, and a step of deaerating the inorganic carbon in the slurry as carbonic acid gas by causing cavitation (local boiling).

Particularly, the present invention is a method for manufacturing a slurry for a positive electrode of a nonaqueous electrolyte secondary battery, in a which carbonic acid gas is dissolved in an electrode slurry under a pressure higher than normal pressure, and inorganic carbon dissolved in the solvent of the slurry is formed so as to obtain an electrode slurry in which the alkali component is neutralized.

According to the related art, N-methylpyrrolodine (NMP) as an organic solvent used as a solvent of a slurry can also dissolve carbonic acid gas.

Therefore, in the present invention, the solvent of the slurry is not particularly limited. However, considering lightening of the environmental load and the solubility of the carbonic acid gas, water is preferable as a solvent.

Incidentally, as methods for dissolving the carbonic acid gas in a liquid, a bubbling method, a carbonate decomposition method, a pressurizing method, and the like are known.

The bubbling method is a method of dissolving carbonic acid gas by causing the carbonic acid gas to flow in a liquid in the form of bubbles. The smaller the volume of the bubbles, the further the carbonic acid gas can be dissolved with higher efficiency. However, in a case where pressure is not applied, the saturated concentration is low, and a neutralization reaction becomes time-consuming.

The carbonate decomposition method is a method of dissolving carbonic acid gas by decomposing a carbonate by using an acid. This method is inappropriate for the present invention because an acid needs to be used.

The pressurizing method is a method of dissolving carbonic acid gas in a liquid under pressure.

Among the aforementioned carbonic acid gas dissolving methods, only the pressurizing method can be used in the present invention. In the pressurizing method, according to Henry's law, by increasing the pressure, high-concentration dissolved inorganic carbon can be obtained.

As a neutralizer, carbonic acid gas is used in the form of dissolved inorganic carbon by being dissolved in a solvent. This is not only because the reaction rate is high as described above, but because the pH level does not become lower than 3 even though an excess of neutralizer is added.

As shown in the following reaction formula, through the neutralization reaction caused by dissolving the carbonic acid gas in a solvent, an alkali metal carbonate and an alkali metal hydrogen carbonate are generated as salts. By drying the slurry in which the alkali metal carbonate and the alkali metal hydrogen carbonate are dissolved, it is possible to obtain an electrode coated with the alkali metal carbonate.

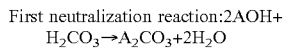

First neutralization reaction:2AOH+ H$_2$CO$_3$→A$_2$CO$_3$+2H$_2$O

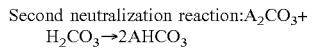

Second neutralization reaction:A$_2$CO$_3$+ H$_2$CO$_3$→2AHCO$_3$

For example, in a case where an alkali metal A is lithium, as shown in the following reaction formula, lithium carbonate and lithium hydrogen carbonate are generated as salts. By drying the slurry in which the lithium carbonate and the lithium hydrogen carbonate are dissolved, it is possible to obtain an electrode coated with the lithium carbonate.

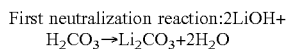

First neutralization reaction:2LiOH+ H$_2$CO$_3$→Li$_2$CO$_3$+2H$_2$O

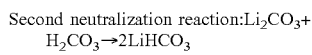

Second neutralization reaction:Li$_2$CO$_3$+ H$_2$CO$_3$→2LiHCO$_3$

As described in the related art, it is known that in a positive electrode coated with lithium carbonate, the water resistance of the electrode is improved.

The electrode manufactured by the method for manufacturing a slurry of the present invention contains a salt (any of lithium carbonate, sodium carbonate, and potassium carbonate) generated by neutralization in the active material layer.

In a case where the electrode does not contain an alkali metal carbonate (any of lithium carbonate, sodium carbonate, and potassium carbonate), the electrolytic solution is decomposed due to overcharging and generates a hydrocarbon gas or a hydrogen gas that is highly flammable. On the contrary, in the electrode containing an alkali metal carbonate, in a case where the battery is overcharged, carbonic acid gas is generated before the electrolytic solution or the positive electrode is decomposed. Therefore, by increasing the internal pressure of the battery by using the carbonic acid gas, a pressure valve mounted on the battery can be operated. The gas mainly released at this time is carbonic acid gas which is safe.

For performing the neutralization treatment on the slurry, a solvent containing dissolved inorganic carbon may be used as a solvent of the slurry in advance. Alternatively, the neutralization treatment may be performed at the time of mixing the slurry. However, in a case where the solvent containing the dissolved inorganic carbon comes into contact with an electrode material (an active material, a conductive auxiliary agent, a binder, or the like), the slurry violently foams (the carbonic acid is evaporated and liberated). Accordingly, it is difficult to handle the slurry.

Furthermore, in a case where the method for manufacturing a slurry includes a step of dispersing and mixing the solid contents of the slurry by causing cavitation (local boiling), sometimes the dissolved inorganic carbon is evaporated and liberated due to the negative pressure, and hence the dispersion efficiency is reduced.

Therefore, it is preferable to neutralize the slurry by adding carbonic acid gas to the slurry in a pressurized state after the solid contents of the slurry are dispersed and mixed together.

The amount of the carbonic acid gas used is set such that the pH level of the slurry becomes 4 to 11, preferably becomes 5 to 10, and more preferably becomes 6 to 9 by the addition of the carbonic acid gas.

The higher the pressure of the carbonic acid gas is, the higher the concentration of the obtained dissolved inorganic carbon can be. Therefore, the pressure is not particularly limited as long as it is equal to or higher than normal pressure. However, from the viewpoint of the neutralization reaction rate, the pressure of the carbonic acid gas is equal to or higher than 0.12 MPa, preferably equal to or higher than 0.2 MPa, and even more preferably equal to or higher than 0.3 MPa.

In a case where the pressure is higher than 100 MPa, not only the scale of the manufacturing apparatus, but the amount of the dissolved inorganic carbon remaining in the slurry having undergone the neutralization treatment increases, and hence a deaeration treatment to be performed later becomes difficult. Therefore, the upper limit of the pressure is equal to or lower than 100 MPa, preferably equal to or lower than 50 MPa, and even more preferably equal to or lower than 10 MPa.

Because the dissolved inorganic carbon remains in the slurry having undergone the neutralization treatment, a deaeration treatment is performed.

In a case where the electrode is coated without performing the deaeration treatment, the active material layer foams in a drying step due to the dissolved inorganic carbon, and too many voids are formed. Therefore, coating unevenness or the exfoliation or detachment of the electrode easily occurs.

By performing the deaeration treatment, the dissolved inorganic carbon in the slurry can be separated as carbonic acid gas from the neutralized slurry.

Although membrane deaeration is mainly performed as the deaeration treatment for an electrode slurry of a practical battery, it is difficult to separate the inorganic carbon formed in the slurry by applying pressure. Therefore, in the present invention, it is preferable to perform deaeration under reduced pressure.

As the method for dispersing and mixing together the solid contents of the slurry, existing mixing methods can be adopted. However, it is preferable to perform dispersing and mixing by causing cavitation (local boiling).

In a case where a method of performing dispersing and mixing by causing cavitation (local boiling) is adopted, by using the same apparatus, the slurry having undergone the neutralization treatment can be deaerated.

That is, by neutralizing the slurry, which is manufactured by performing dispersing and mixing by causing cavitation (local boiling), by means of adding carbonic acid gas to the slurry in a pressurized state and performing deaeration under reduced pressure by means of causing cavitation (local boiling) again in the slurry, the dispersing and mixing apparatus can also function as a deaerating apparatus. Therefore, this method is economical.

The slurry contains an active material and a binder as solid contents. If necessary, a conductive auxiliary agent is added to the slurry.

The active material is not particularly limited as long as it is an alkali metal complex oxide. In a case where the nonaqueous electrolyte secondary battery is a lithium secondary battery, examples of the active material include lithium complex oxides, that is, the materials such as lithium cobaltate ($LiCoO_2$) lithium nickelate ($LiNiO_2$), a ternary material ($LiNi_{0.33}Co_{0.33}Mn_{0.33}O_2$), a nickel-enriched ternary material ($LiNi_{0.5}Co_{0.2}Mn_{0.3}O_2$), lithium nickel-cobalt-aluminate ($LiNi_{0.8}Co_{0.15}Al_{0.05}O_2$), lithium iron phosphate ($LiFePO_4$), lithium manganese-iron-phosphate ($LiFe_{0.5}Mn_{0.5}PO_4$), lithium manganese phosphate ($LiMnPO_4$), lithium cobalt phosphate ($LiCoPO_4$), lithium nickel phosphate ($LiNiPO_4$), lithium vanadium phosphate ($Li_3V_2(PO_4)_3$), lithium iron silicate ($Li_2FeSiO_4$), lithium manganese silicate ($Li_2MnSiO_4$), a lithium-enriched solid solution-based material ($Li_2MnO_3$—$LiNi_{0.33}Mn_{0.33}Co_{0.33}O_2$), spinel-type lithium manganate ($LiMn_2O_4$), spinel-type lithium nickel-manganate ($LiNi_{0.5}Mn_{1.5}O_4$), and lithium nickel-iron-manganate ($LiNi_{0.33}Fe_{0.33}Mn_{0.33}O_2$). One kind of these may be used singly, or two or more kinds of these may be used in combination. The ratio between the elements in the above active materials may be slightly different from the ratio described above. Furthermore, in a case where the nonaqueous electrolyte secondary battery is a sodium secondary battery, the active material may be a sodium complex oxide, that is, lithium as the aforementioned alkali metal element may be substituted with sodium. In a case where the nonaqueous electrolyte secondary battery is a potassium secondary battery, lithium may be substituted with potassium.

Examples of the binder include generally used materials such as polyvinylidene fluoride (PVDF), polytetrafluoroethylene (PTFE), polyimide (PI), polyamide, polyamide-imide (PAI), aramid, polyacryl, polyacrylate, an acrylic acid ester, styrene butadiene rubber (SBR), urethane, an ethylene-vinyl acetate copolymer, a styrene-ethylene-butylene-styrene copolymer (SEBS), carboxymethyl cellulose (CMC), cellulose sulfate, methyl cellulose ether, methyl ethyl cellulose ether, ethyl cellulose ether, low-nitrogen hydroxyethyl cellulose dimethyldiallyl ammonium chloride (polyquaternium-4), [2-hydroxy-3-(trimethylammonio)propyl]hydroxyethyl cellulose chloride (polyquaternium-10), [2-hydroxy-3-(lauryldimethylammonio)propyl]hydroxyethyl cellulose chloride (polyquaternium-24), polyvinyl alcohol (PVA), polyvinyl butyral (PVB), ethylene vinyl alcohol, polyethylene (PE), polypropylene (PP), and starch. One kind of these may be used singly or two or more kinds of these may be used in combination.

The conductive auxiliary agent is not particularly limited, and examples thereof include a metal, a carbon material, a conductive polymer, conductive glass, and the like. Among these, a carbon material is preferable, and specific examples thereof include acetylene black (AB), Ketjenblack (KB), vapor-grown carbon fiber (VGCF), carbon nanotubes (CNT), graphite, hard carbon, soft carbon, furnace black, graphene, glassy carbon, carbon nanohorns, and the like. One kind of these may be used singly, or two or more kinds of these may be used in combination.

In the active material layer of the positive electrode, for example, provided that the total amount of the positive electrode active material, the binder, and the conductive material is 100% by mass, the amount of the positive electrode active material is preferably 60% to 99% by mass, the amount of the binder is preferably 0.1% to 25% by mass, and the amount of the conductive material is preferably 0.1% to 10% by mass. The amount of the positive electrode active material is more preferably 80% to 95% by mass, the amount of the binder is more preferably 0.5% to 15% by mass, and the amount of the conductive material is more preferably 0.5% to 5% by mass.

In a case where the active material layer of the positive electrode is composed as above, a sufficient binding force and a conductivity improving effect are obtained.

The neutralizer is not particularly limited as long as it is dissolved inorganic carbon obtained by dissolving carbonic acid gas in the solvent of the slurry. That is, the dissolved inorganic carbon may be generated using a gas such as air containing carbonic acid gas or the carbonic acid gas generated from a solid including dry ice. In order to efficiently obtain the dissolved inorganic carbon at a relatively low pressure, it is preferable to use a high-concentration carbonic acid gas.

By using the slurry for a positive electrode of a nonaqueous electrolyte secondary battery that is obtained by the method for manufacturing a slurry for a positive electrode of a nonaqueous electrolyte secondary battery of the present invention, a positive electrode of a nonaqueous electrolyte secondary battery, specifically, a positive electrode of a nonaqueous electrolyte secondary battery coated with an alkali metal carbonate can be manufactured. By using the positive electrode, a nonaqueous electrolyte secondary battery can be manufactured. Furthermore, the nonaqueous electrolyte secondary battery can be suitably used in electronic devices.

Dispersing and Mixing Step (Dispersing and Mixing Apparatus)

In the dispersing and mixing step of the method for manufacturing a slurry for a positive electrode, it is possible to adopt generally used methods, for example, existing methods such as a shearing method, an ultrasonic method, and a cavitation (local boiling) method.

It is known that the battery performance of a nonaqueous electrolyte secondary battery is greatly affected by the electrode characteristics depending on the manufacturing conditions of the electrode slurry. Therefore, in the present invention, it is preferable that the electrode active material, the conductive auxiliary agent, and the binder are uniformly dispersed in the positive electrode slurry.

In a case where water is used as the solvent of the slurry, lumps or clots of the active material or the conductive auxiliary agent are easily formed and easily causes the problem of nonuniformity of the slurry in the dispersed state. Accordingly, among the aforementioned dispersing and mixing methods, it is preferable to adopt a method which can uniformly disperse the positive electrode slurry.

Particularly, in the present invention, in a case where the surplus carbonic acid gas in the slurry is not deaerated by cavitation (local boiling), it is difficult to prepare a uniform positive electrode. Therefore, it is also preferable to adopt the cavitation (local boiling) method in the mixing and dispersing method.

Hereinafter, a dispersing and mixing apparatus including a dispersing and mixing pump adopting the cavitation (local boiling) method used in the dispersing and mixing step of the method for manufacturing a slurry for a positive electrode of a nonaqueous electrolyte secondary battery of the present invention will be described based on FIGS. 1 to 8.

FIG. 1 shows a dispersing and mixing apparatus 100 including a centrifugal dispersing and mixing pump Y.

The dispersing and mixing apparatus 100 generates a slurry F by using powder P (solid content) as a dispersoid and using a solvent R as a liquid-phase dispersion medium and by dispersing and mixing (including dissolving of soluble solid contents, the same shall be applied to the following description) the powder P in the solvent R.

In the present embodiment, for example, an active material trapping and releasing alkali metal ions, a carbon-based conductive auxiliary agent, and an aqueous binder, which are slurry materials used for manufacturing an electrode for a nonaqueous electrolyte secondary battery, are used as the powder P, and water is used as the solvent R.

As shown in FIG. 1, the dispersing and mixing apparatus 100 is constituted with a quantitative supply device X that quantitatively supplies the powder P, a solvent supply portion 50 that quantitative supplies the solvent R, a dispersing and mixing pump Y that aspirates the powder P quantitatively supplied from the quantitative supply device X and the solvent R quantitatively supplied from the solvent supply portion 50 by using a negative pressure and dispersing and mixing the powder P and the solvent R together, a recirculation mechanism portion 70 that circulates and supplies the solvent R containing the powder P which is not completely dispersed and mixed (hereinafter, referred to as "non-dispersed slurry Fr") to the dispersing and mixing pump Y from the slurry F discharged from the dispersing and mixing pump Y, and the like.

Quantitative Supply Device

As shown in FIG. 1, the quantitative supply device X is constituted with a hopper 31 that discharges the powder P received from an upper opening portion 31a through a lower opening portion 31b, a stirring mechanism 32 that stirs the powder P in the hopper 31, a volumetric quantitative supply portion 40 that quantitatively supplies the powder P discharged from the lower opening portion 31b to the dispersing and mixing pump Y by using the negative-pressure aspiration force acting on the lower opening portion 31b due to the aspiration of the dispersing and mixing pump Y connected to the downstream side of the lower opening portion 31b in a state where the upper opening portion 31a of the hopper 31 is open to the atmosphere.

The hopper 31 has the shape of an inverted cone whose diameter decreases toward the lower portion from the upper portion, and is disposed such that a central axis A1 thereof is in a vertical direction. When seen in the vertical direction of FIG. 1, each of the upper opening portion 31a and the lower opening portion 31b of the hopper 31 has a circular cross-sectional shape that has the central axis A1 as the center thereof. The inner wall surface of the inverted cone shape of the hopper 31 inclines at about 60° with respect to the horizontal plane.

The stirring mechanism 32 is constituted with a stirring blade 32A that is disposed in the hopper 31 and stirs the powder P in the hopper 31, a blade driving motor M1 that rotates the stirring blade 32A around the central axis A1 of the hopper 31, a mounting member 32B that supports the blade driving motor M1 by positioning the motor M1 above the upper opening portion 31a of the hopper 31, and a transmission member 32C that transmits the rotary driving force of the blade driving motor M1 to the stirring blade 32A.

The stirring blade 32A is constituted with a rod-like member bending approximately in a V shape, and is in a state where one side of the stirring blade 32A extends along the inner wall surface of the hopper 31 while the other side thereof is pivoted so as to freely rotate around the same axis as the central axis A1 of the hopper 31. The cross-section of the stirring blade 32A is in the form of a triangle, and the stirring blade 32A is disposed such that a surface forming one side of the triangle is approximately parallel to the inner wall surface of the hopper 31. As a result, the stirring blade 32A is disposed so as to be able to rotate around the central axis A1 along the inner wall surface of the hopper 31.

Figure 2:
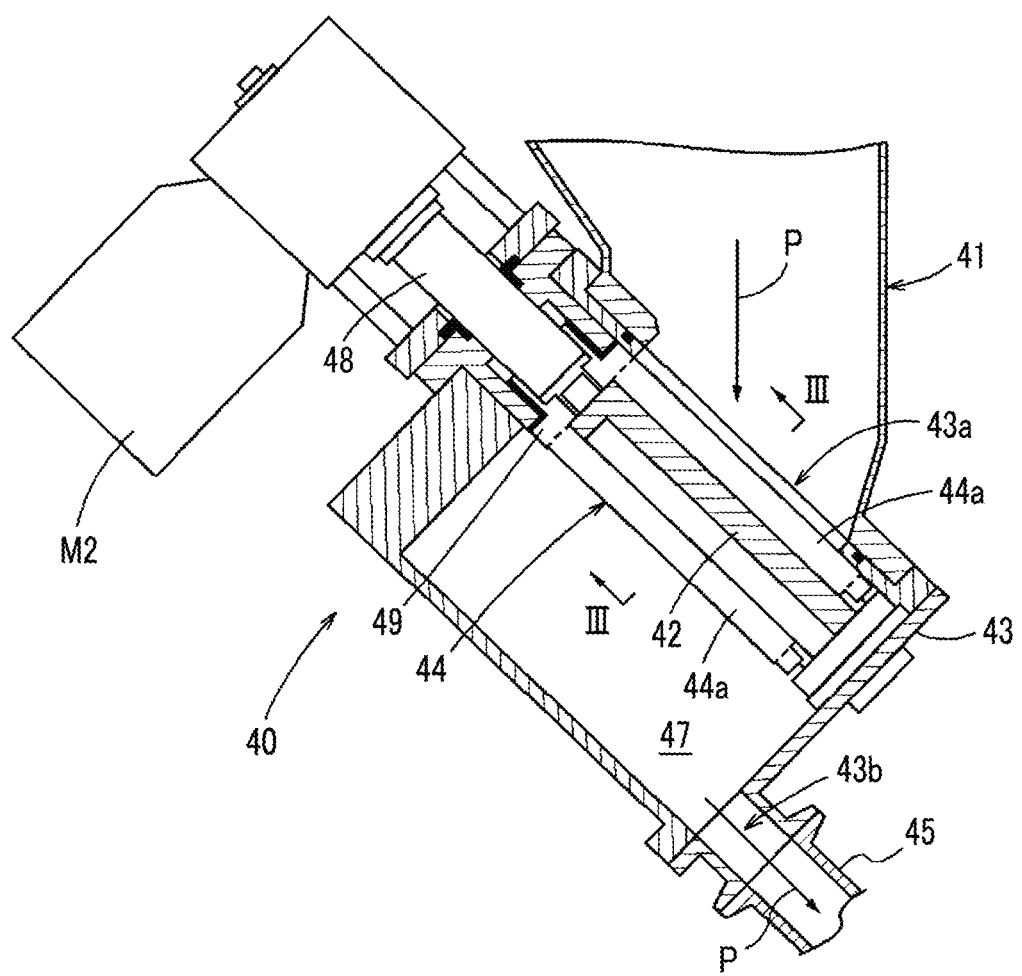
FIG. 2 is a longitudinal cross-sectional view showing main portions of a quantitative supply device.
Figure 3:
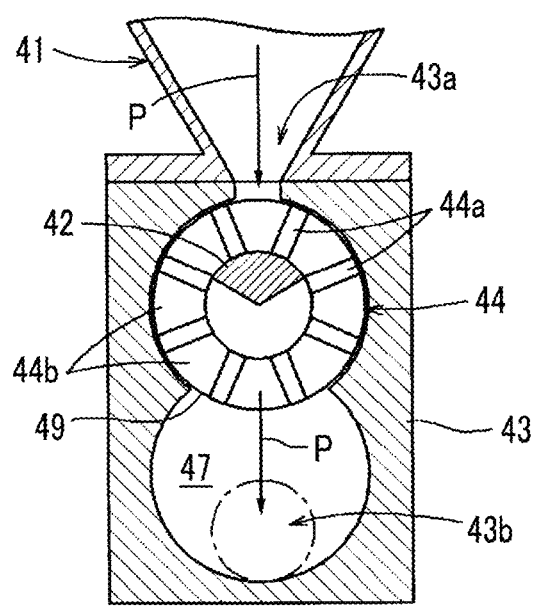
FIG. 3 is a cross-sectional view taken along the III-III direction in FIG. 2.

As shown in FIGS. 1 to 3, the volumetric quantitative supply portion 40 is a mechanism for quantitatively supplying the powder P supplied from the lower opening portion 31b of the hopper 31 to the dispersing and mixing pump Y on the downstream side by a predetermined amount.

Specifically, the volumetric supply portion 40 is constituted with an introduction portion 41 that is connected to the lower opening portion 31b of the hopper 31, a casing 43 that includes a supply port 43a and a discharge port 43b, a metering rotator 44 that is disposed to be able to rotate in the casing 43, and a metering rotator driving motor M2 that rotates and drives the metering rotator 44.

The introduction portion 41 is in the form of a cylinder that enables the lower opening portion 31b of the hopper 31 to communicate with the supply port 43a formed in the upper portion of the casing 43. In the lowermost portion of the introduction portion 41, a slit-like opening of the same shape as that of the supply port 43a of the casing 43 is formed. The introduction portion 41 has a tapered shape that becomes thinner toward the supply port 43a side of the casing 43. The shape of the slit-like opening can be appropriately set according to the size of the hopper 31, the amount of the powder P supplied, the characteristics of the powder P, and the like. For example, the shape is set such that the size of the slit-like opening becomes about 20 to 100 mm in the longitudinal direction and becomes about 1 to 5 mm in the width direction.

The casing 43 is approximately in the form of a rectangle, and is connected to the hopper 31 through the introduction portion 41, inclining at about 45° with respect to the horizontal direction (transverse direction in FIG. 1).

As shown in FIGS. 2 and 3, the upper surface of the casing 43 is provided with the slit-like supply port 43a corresponding to the slit-like opening of the introduction portion 41. The supply port 43a is constituted such that the powder P from the lower opening portion 31b of the hopper 31 can be supplied into the casing 43. The lower portion of the lateral surface (right lateral surface in FIG. 2) on the lower side of the obliquely disposed casing 43 is provided with the discharge port 43b that discharges the powder P quantitatively supplied through the metering rotator 44 to the dispersing and mixing pump Y on the downstream side through an expansion chamber 47. The discharge port 43b is connected to a powder discharge pipe 45. The expansion chamber 47 is positioned in the interior of the casing 43 to which the powder P supplied to a powder accommodation chamber 44b of the metering rotator 44 from the supply port 43a is quantitatively supplied. Due to the negative-pressure aspiration force applied from the discharge port 43b, the internal pressure of the expansion chamber 47 is kept lower than the pressure at the supply port 43a. That is, because the discharge port 43b is connected to a primary side of the dispersing and mixing pump Y, the negative-pressure aspiration force acts on the expansion chamber 47, and hence the internal pressure of the expansion chamber 47 is kept lower than the pressure at the discharge port 43b. The casing 43 is constituted such that the internal pressure of each powder accommodation chamber 44b changes to a negative pressure or to a pressure higher than the negative pressure along with the rotation of the metering rotator 44.

The metering rotator 44 has a constitution in which a plurality of plate-like partitions 44a (for example, eight partitions) are radially mounted at the same interval on a discoid member 49 disposed on a driving shaft 48 of the metering rotator driving motor M2, except for the central portion of the discoid member 49. The metering rotator 44 is constituted such that the powder accommodation chamber 44b is divided into a plurality of chambers (for example, eight chambers) at the same interval in the circumferential direction. The powder accommodation chamber 44b is constituted such that it is open in the outer peripheral surface and the central portion of the metering rotator 44. In the central portion of the metering rotator 44, a stationary opening-closing member 42 is disposed which is localized in the circumferential direction. The opening-closing member 42 is constituted so as to be able to close or open the opening of each powder accommodation chamber 44b on the central portion side according to the phase of rotation. The amount of the powder P supplied can be adjusted by changing the rotation speed of the metering rotator 44 determined by the metering rotator driving motor M2 that rotates and drives the metering rotator 44.

The metering rotator 44 has a constitution in which, with the rotation of the metering rotator 44, the state of each powder accommodation chamber 44b repeatedly changes to an open-to-expansion chamber state where the chamber 44b is open to the expansion chamber 47, a first sealed state where the chamber 44b does not communicate with the expansion chamber 47 and the supply port 43a, an open-to-supply port state where the chamber 44b is open to the supply port 43a, and a second sealed state where the chamber 44b does not communicate with the supply port 43a and the expansion chamber 47 in this order. The casing 43 is formed such that the opening of the metering rotator 44 on the outer peripheral surface side is closed in the first sealed state and the second sealed state. Furthermore, The opening-closing member 42 is fixed to and disposed in the casing 43 such that the opening of the metering rotator 44 on the central portion side is closed in the first sealed state, the open-to-supply port state, and the second sealed state.

Accordingly, in the quantitative supply device X, the powder P stored in the hopper 31 is supplied to the quantitative supply portion 40 while being stirred with the stirring blade 32A. By the quantitative supply portion 40, the powder P is quantitatively supplied from the discharge port 43b to the dispersing and mixing pump Y through the powder discharge pipe 45.

Specifically, due to the negative-pressure aspiration force from the dispersing and mixing pump Y connected to the downstream side of the discharge port 43b of the quantitative supply portion 40, the internal pressure of the expansion chamber 47 in the casing 43 becomes negative pressure. In contrast, because the upper opening portion 31a of the hopper 31 is open to the atmosphere, the internal pressure of the hopper 31 is approximately the same as the atmospheric pressure. In the interior of the introduction portion 41 that communicates with the expansion chamber 47 through voids of the metering rotator 44 and in the vicinity of the lower opening portion 31b, the pressure is in between the negative pressure described above and the atmospheric pressure.

In this state, in a case where the powder P on the inner wall surface of the hopper 31 and in the vicinity of the lower opening portion 31b is stirred with the stirring blade 32A of the stirring mechanism 32, the powder P in the hopper 31 is disintegrated due to the shearing action resulting from the stirring blade 32A. Meanwhile, the metering rotator 44 is rotated by the metering rotator driving motor M2, and the empty powder accommodation chambers 44b communicate with the supply port 43a one after another. Then, the powder P in the hopper 31 flows down the introduction portion 41 from the lower opening portion 31b, and is accommodated by a predetermined amount in the powder accommodation chambers 44b of the metering rotator 44 that become in communication with the supply port 43a one after another. The powder P accommodated in the powder accommodation chambers 44b flows down the expansion chamber 47 and is discharged from the discharge port 43b. Accordingly, by the quantitative supply device X, the powder P can be continuously quantitatively supplied to a first supply portion 11 of the dispersing and mixing pump Y by a predetermined amount through the powder discharge pipe 45.

As shown in FIG. 1, in the powder discharge pipe 45, a shutter valve 46 that can stop the supply of the powder P to the first supply portion 11 of the dispersing and mixing pump Y is disposed.

Solvent Supply Portion

As shown in FIG. 1, the solvent supply portion 50 has a constitution in which the solvent R stored in the storage and mixing tank 51 is continuously supplied to the first supply portion 11 of the dispersing and mixing pump Y at a preset flow rate. Specifically, the solvent supply portion 50 is constituted with the storage and mixing tank 51 that stores and delivers the solvent R supplied through a solvent supply pipe 51R, a supply pipe 52 to which the solvent R is supplied from the storage and mixing tank 51 and which includes a delivery pump 52P in the middle of the pipe, a flow rate adjusting valve (not shown in the drawing) that adjusts the flow rate of the solvent R delivered to the supply pipe 52 from the storage and mixing tank 51 to be a preset flow rate, and a mixing mechanism 60 that mixes the solvent R, whose preset flow rate is adjusted, with the powder P quantitatively supplied from the quantitative supply portion 40 and supplies the mixture to the first supply portion 11.

As will be described later, the storage and mixing tank 51 is constituted such that the slurry F in which the powder P is dispersed and mixed is introduced into the tank 51 from a discharge path 22 together with the bubbles contained in the slurry F.

Accordingly, in the storage and mixing tank 51, a stirring mechanism 51K is disposed, and the tank 51 is connected to a discharge pipe 51G for the air (gas) and a discharge path 53 for the manufactured slurry F.

Figure 4:
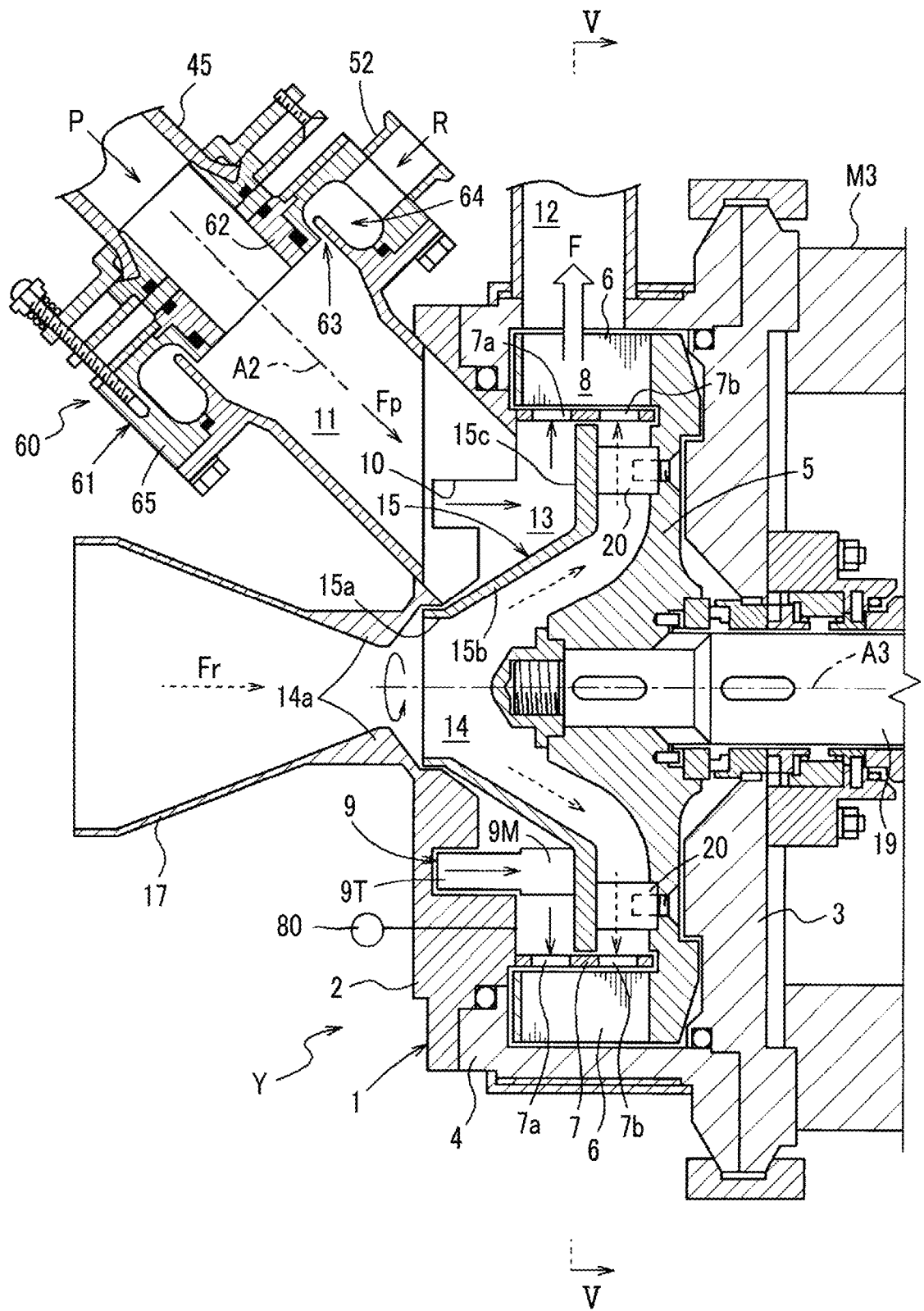
FIG. 4 is a view illustrating the internal structure of a dispersing and mixing mechanism of the dispersing and mixing pump.

As shown in FIG. 4, the mixing mechanism 60 is constituted with a mixing member 61 that allows the powder discharge pipe 45 and the supply pipe 52 to communicate with and to be connected with the first supply portion 11.

The mixing member 61 is constituted with a cylindrical portion 62 that has a diameter smaller than that of the cylindrical first supply portion 11 and is disposed in a state of being inserted into the first supply portion 11 such that a ring-like slit 63 is formed between the cylindrical portion 62 and the first supply portion 11, and a ring-like flow path-forming portion 65 that forms a ring-like flow path 64 in the outer peripheral portion of the first supply portion 11 in a state of communicating with the ring-like slit 63 all around the slit.

The mixing member 61 is connected to the powder discharge pipe 45 that is in a state of communicating with the cylindrical portion 62 and is connected to the supply pipe 52 such that the solvent R is supplied to the ring-like flow path 64 in a tangential direction.

The powder discharge pipe 45, the cylindrical portion 62 of the mixing member 61, and the first supply portion 11 are disposed such that an axis A2 of these is inclined (at about 45° with respect to the horizontal plane (transverse direction in FIG. 1)) and the powder is supplied downwardly.

That is, the powder P discharged to the powder discharge pipe 45 from the discharge port 43b of the quantitative supply portion 40 is introduced into the first supply portion 11 along the axis A2 through the cylindrical portion 62 of the mixing member 61. Meanwhile, the solvent R is supplied to the ring-like flow path 64 in a tangential direction. Therefore, through the ring-like slit 63 formed on the inner peripheral side of the ring-like flow path 64, the solvent R is supplied to the first supply portion 11 while swirling in the form of a hollow cylinder without discontinuity.

Accordingly, by the cylindrical first supply portion 11, the powder P and the solvent R are evenly premixed together, and a premix Fp formed in this way is aspirated and introduced into a first introduction chamber 13 of the dispersing and mixing pump Y.

Dispersing and Mixing Pump

Based on FIG. 1 and FIGS. 4 to 8, the dispersing and mixing pump Y will be described. As shown in FIG. 4, the dispersing and mixing pump Y is constituted with a casing 1 including a cylindrical outer peripheral wall portion 4 having openings on both ends thereof that are closed by a front wall portion 2 and a rear wall portion 3, a rotor 5 that is provided in the interior of the casing 1 so as to be driven to freely rotate concentrically, a cylindrical stator 7 that is disposed in a state of being concentrically fixed to the front wall portion 2 in the interior of the casing 1, a pump driving motor M3 that rotates and drives the rotor 5, and the like.

Figure 5:
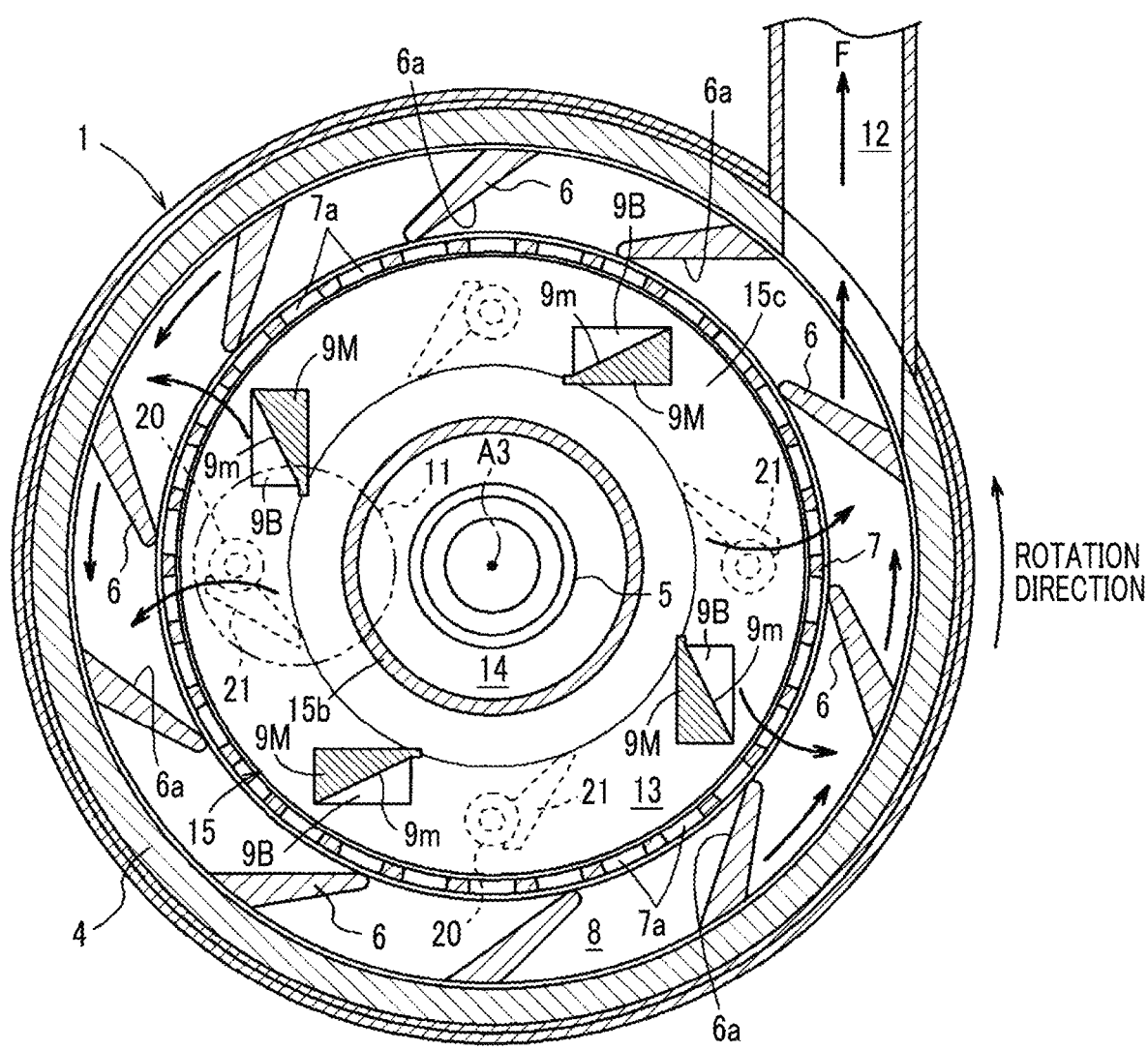
FIG. 5 is a cross-sectional view taken along the V-V direction in FIG. 4.

As shown in FIG. 5, on the outside of the rotor 5 in the radial direction, a plurality of rotary blades 6 protrude to the front side (left side in FIG. 4) which is the front wall portion 2 side, and are integrated with the rotor 5 in a state of being arrayed at the same interval in the circumferential direction.

On the cylindrical stator 7, a plurality of through holes 7a and 7b functioning as restriction flow paths are arrayed in the circumferential direction. The stator 7 is disposed in and fixed to the front wall portion 2, in a position that is the front side (left side in FIG. 4) of the rotor 5 and the inside of the rotary blades 6 in the radial direction. Between the stator 7 and the outer peripheral wall portion 4 of the casing 1, a ring-like blade chamber 8 is formed which functions as a discharge chamber as well and along which the rotary blades 6 circle.

Figure 6:
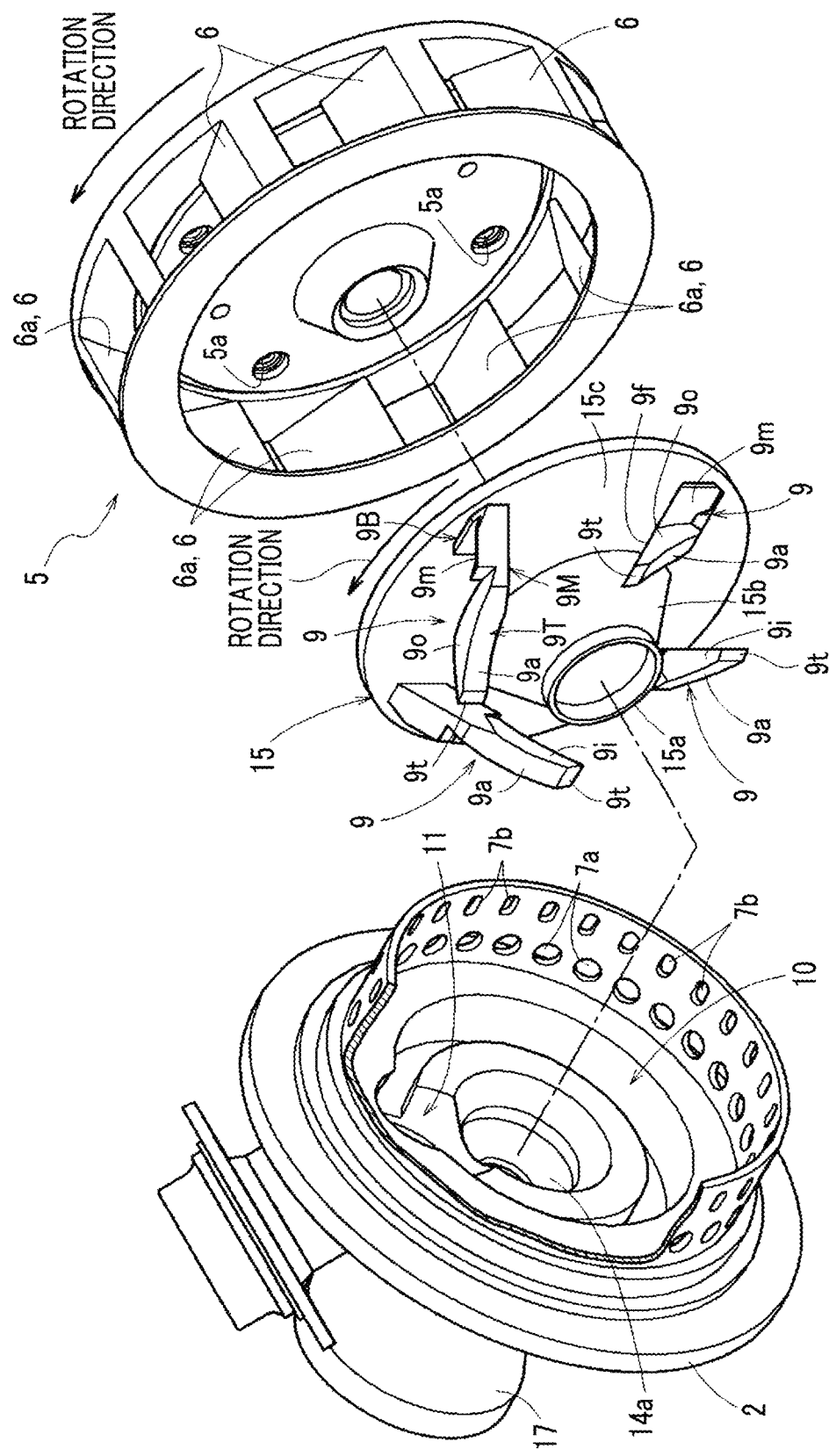
FIG. 6 is an exploded perspective view showing the internal structure of the dispersing and mixing mechanism of the dispersing and mixing pump.

As shown in FIGS. 4 to 6, the first supply portion 11, from which the premix Fp obtained by premixing the powder P with the solvent R in the mixing mechanism 60 is introduced and aspirated into the casing 1 by the rotation of the rotary blades 6, is provided in a position closer to the outer peripheral side than to the central axis (axis A3 of the casing 1) of the front wall portion 2.

As shown in FIGS. 4 and 6, a ring-like groove 10 is formed on the inner surface of the front wall portion 2 of the casing 1, and the first supply portion 11 is provided in a state of communicating with the ring-like groove 10.

As shown in FIGS. 4 and 5, a cylindrical discharge portion 12, which discharges the slurry F generated by mixing the powder P with the solvent R, is provided at one site of a cylindrical outer peripheral wall portion 4 of the casing 1 in the circumferential direction, in a state of extending in a tangential direction tangent of the outer peripheral wall portion 4 and communicating with the blade chamber 8.

Figure 8:
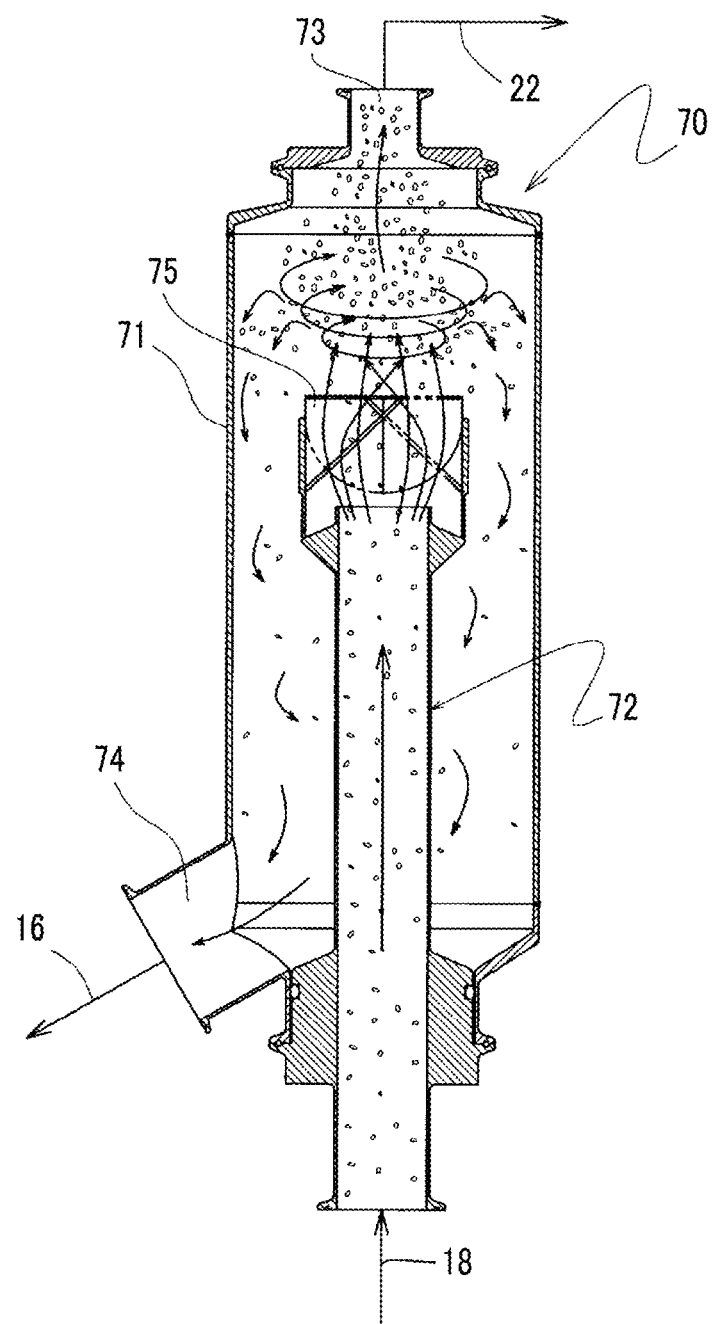
FIG. 8 is a view illustrating the internal structure of a separation portion of a recirculation mechanism portion.

As shown in FIGS. 1, 4, and 8, in the present embodiment, the slurry F discharged from the discharge portion 12 is supplied to the recirculation mechanism portion 70 through a discharge path 18. Furthermore, a second supply portion 17 circulating and supplying the non-dispersed slurry Fr, from which bubbles are separated by the cylindrical container 71 as a separation portion of the recirculation mechanism portion 70, into the casing 1 through a circulation flow path 16 having a circulation pump 16P rotated and driven by a pump driving motor M4 in the middle of the flow path 16 is provided in the central portion (coaxial with the axis A3) of the front wall portion 2 of the casing 1.

In addition, as shown in FIGS. 4 to 6, a divider 15, which divides the inner peripheral side of the stator 7 into a first introduction chamber 13 on the front wall portion 2 side and a second introduction chamber 14 on the rotor 5 side, is provided on the front side of the rotor 5 in a state of rotating together with the rotor 5. Moreover, scraping blades 9 are provided in the divider 15 on the front wall portion 2 side. A plurality of (four in FIG. 6) coaxial scraping blades 9 are arrayed at the same interval in the circumferential direction.

The scraping blades 9 are disposed such that each of them can circle together with the rotor 5, in a state where a tip portion 9T thereof is inserted in the ring-like groove 10.

The first introduction chamber 13 and the second introduction chamber 14 are constituted, such that they communicate with the blade chamber 8 through the plurality of through holes 7a and 7b of the stator 7, the first supply portion 11 communicates with the first introduction chamber 13, and the second supply portion 17 communicates with the second introduction chamber 14.

Specifically, the first introduction chamber 13 and the blade chamber 8 communicate with each other through the plurality of through holes 7a on the first introduction chamber 13 side that are disposed at the same interval along the circumferential direction in a portion approaching the first introduction chamber 13 in the stator 7. The second introduction chamber 14 and the blade chamber 8 communicate with each other through the plurality of through holes 7b on the second introduction chamber 14 side that are disposed at the same interval along the circumferential direction in a portion approaching the second introduction chamber 14 in the stator 7.

Each portion of the dispersing and mixing pump Y will be described.

As shown in FIG. 4, the rotor 5 has a shape in which the front surface thereof protrudes approximately in the form of a truncated cone shape. On the outer peripheral side of the rotor 5, the plurality of rotary blades 6 are arrayed at the same interval in a state of protruding toward the front. In FIG. 5, ten rotary blades 6 are disposed at the same interval in the circumferential direction. Each of the rotary blades 6 protrudes from the outer peripheral side of the rotor 5 toward the inner peripheral side, such that the rotary blade 6 gradually inclines to the back of the rotation direction as the blade becomes close to the outer peripheral side from the inner peripheral side. The inner diameter of the tip portion of each of the rotary blades 6 is slightly larger than the outer diameter of the stator 7.

The rotor 5 is positioned in the casing 1 coaxially with the casing 1. In this state, the rotor 5 is connected to a driving shaft 19 of a pump driving motor M3 which penetrates the rear wall portion 3 and is inserted in the casing 1, and is rotated and driven by the pump driving motor M3.

The rotor 5 has a constitution in which the rotor 5 is driven to rotate in a direction along which the tip portion of each of the rotary blades 6 becomes the front side when the rotor 5 is seen in the axial direction thereof (V-V direction in FIG. 4 as shown in FIG. 5), whereby so-called cavitation (local boiling) occurs on a surface (rear surface) 6a of each of the rotary blades 6 that becomes a rear side in the rotation direction.

As shown in FIGS. 4, 6, and 7A to 7C, the divider 15 is approximately in the form of a funnel having an outer diameter slightly smaller than the inner diameter of the stator 7. Specifically, the funnel-like divider 15 has a shape including a funnel-like portion 15b which is in the central portion of the divider 15 and opened by a cylindrical sliding portion 15a whose apex protrudes in the form of a cylinder and a ring-like flat plate portion 15c which is in the outer peripheral portion of the funnel-like portion 15b and in which both the front surface and the rear surface are orthogonal to the axis A3 of the casing 1.

As shown in FIGS. 4 and 5, in a state where the cylindrical sliding portion 15a of the apex of the divider 15 faces the front wall portion 2 side of the casing 1, the divider 15 is mounted on a mounting portion 5a on the front surface of the rotor 5 through interval maintaining members 20 disposed at a plurality of sites (four sites in the present embodiment) arrayed at the same interval in the circumferential direction.

Figure 7A:
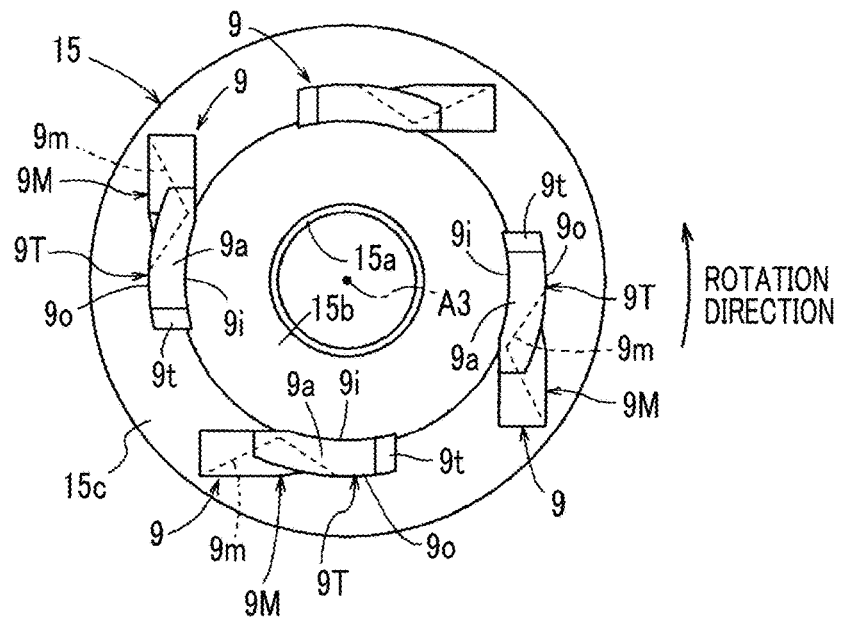
FIGS. 7A to 7C are views schematically showing the constitution of a divider.
Figure 7B:
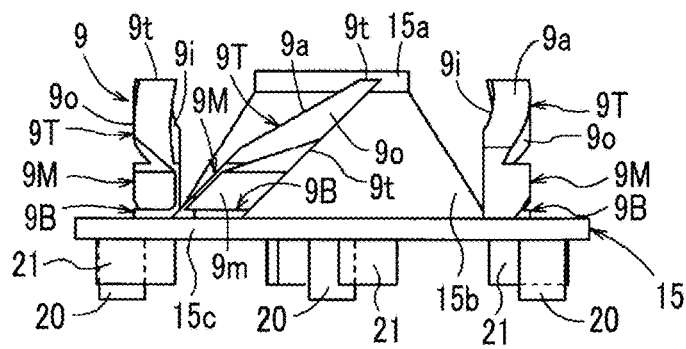
Figure 7C:
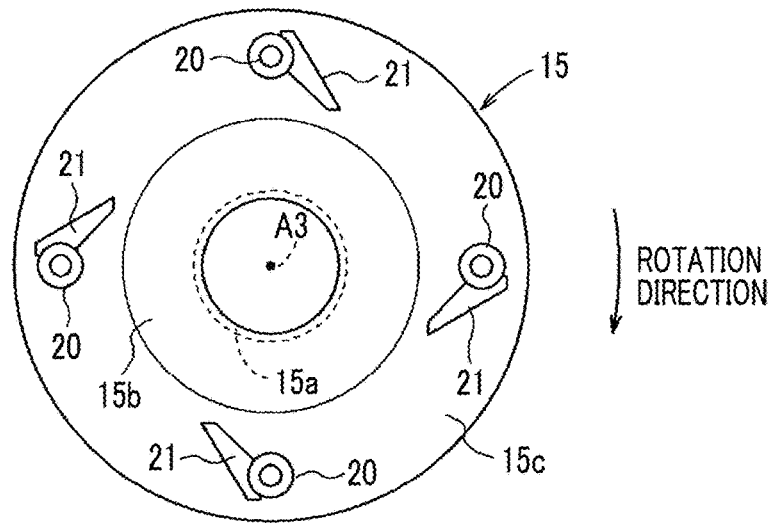

As shown in FIGS. 5 and 7C, the present embodiment adopts a constitution in which in a case where the divider 15 is mounted on the rotor 5 at a plurality of sites through the interval maintaining members 20, stirring blades 21 are also mounted together with the divider 15 in a state of facing the rear wall portion 3 side of the casing 1, and in a case where the rotor 5 is driven to rotate, four stirring blades 21 rotate together with the rotor 5.

As shown in FIGS. 4 and 6, in the present embodiment, the cylindrical second supply portion 17 is provided in the central portion of the front wall portion 2 of the casing 1, coaxially with the casing 1. In the second supply portion 17, a restriction portion 14a is formed which has a diameter smaller than both the inner diameter of the circulation flow path 16 and the diameter of the cylindrical sliding portion 15a of the divider 15 and has a small flow path area. By the rotation of the rotary blades 6 of the rotor 5, the slurry F is discharged through the discharge portion 12, and the non-dispersed slurry Fr is introduced through the restriction portion 14a of the second supply portion 17. As a result, the internal pressure of the dispersing and mixing pump Y is reduced.

As shown in FIGS. 4 to 6, the first supply portion 11 is provided in the front wall portion 2 such that the opening portion (inlet portion) thereof open to the interior of the casing 1 is positioned on the lateral side of the opening portion of the second supply portion 17 facing the interior of the casing 1, in a state where a portion of the ring-like groove 10 in the circumferential direction is included in the interior of the opening portion. When seen in a plan view (vertical direction in FIGS. 1 and 4), the axis A2 of the first supply portion 11 is parallel to the axis A3 of the casing 1. Furthermore, when seen in a horizontal direction orthogonal to the axis A3 of the casing 1 (when seen in a direction penetrating the pages on which FIGS. 1 and 4 are shown), the first supply portion 11 is provided in the front wall portion 2 of the casing 1, in a state of inclining toward the bottom such that the first supply portion 11 becomes close to the axis A3 of the casing 1 as the axis A2 becomes close to the front wall portion 2 of the casing 1. In addition, the first supply portion 11 inclines toward the bottom with respect to the horizontal direction (transverse direction in FIGS. 1 and 4) at about 45° as described above.

As shown in FIGS. 4 and 6, the stator 7 is mounted on and fixed to the inner surface (surface facing the rotor 5) of the front wall portion 2 of the casing 1 such that the front wall portion 2 of the casing 1 and the stator 7 are integrated. In the stator 7, the plurality of through holes 7a on the first introduction chamber 13 side that are disposed in a portion approaching the first introduction chamber 13 are approximately in the form of a circle. The total flow path area of the plurality of through holes 7a on the first introduction chamber 13 side is set to be smaller than the flow path area of the first introduction chamber 13. Furthermore, the plurality of through holes 7b on the second introduction chamber 14 side that are disposed in a portion approaching the second introduction chamber 14 are approximately in the form of an ellipse. The total flow path area of the plurality of through holes 7b on the second introduction chamber 14 side is set to be smaller than the flow path area of the second introduction chamber 14. By the rotation of the rotary blades 6 of the rotor 5, the slurry F is discharged through the discharge portion 12, the premix Fp is supplied through the through holes 7a on the first introduction chamber 13 side, and the non-dispersed slurry Fr is introduced through the second supply portion 17. As a result, the internal pressure of the dispersing and mixing pump Y is reduced.

As shown in FIGS. 6 and 7A to 7C, in the present embodiment, each of the scraping blades 9 is in the form of a rod. When seen in the radial direction of the rotor 5 (when seen in the direction penetrating the page on which FIG. 7B is shown), each of the scraping blades 9 inclines such that the scraping blade 9 is positioned on the front wall portion 2 side by the tip side of the rod-like scraping blade 9, and when seen in the axial direction of the rotor 5 (when seen in the direction penetrating the page on which FIG. 7A is shown), each of the scraping blades 9 inclines such that the scraping blade 9 is positioned on the inside of the rotor 5 in the radial direction by the tip side of the rod-like scraping blade 9. In this state, the base portion 9B of the rod-like scraping blade 9 is fixed such that the scraping blade 9 rotates together with the rotor 5, and the rotor 5 is driven to rotate in a direction along which the tip of the scraping blade 9 becomes the front side (a direction indicated by the arrow in FIGS. 4 to 7) when seen in the axial direction of the rotor 5 (when seen in the direction penetrating the page on which FIG. 7A is shown).

The scraping blades 9 will be described based on FIGS. 5 to 7. Each of the scraping blades 9 is in the form of a rod in which the base portion 9B fixed to the divider 15, a middle portion 9M exposed to the first introduction chamber 13, and the tip portion 9T fitted into (that is, inserted into) the ring-like groove 10 continue from the base to the tip in series.

As shown in FIGS. 5, 6, and 7B, the base portion 9B of each of the scraping blades 9 is approximately in the form of a rectangular plate.

As shown in FIGS. 5, 6, 7A, and 7B, the middle portion 9M of each of the scraping blades 9 is approximately in the form of a triangular prism having an approximately triangular cross-sectional shape (particularly, see FIG. 5). The present embodiment adopts a constitution in which the scraping blades 9 are provided in a state of inclining as described above, and accordingly, among the three lateral surfaces of the middle portion 9M having a triangular prism shape, one lateral surface 9m (hereinafter, described as "radiation surface" in some cases) which faces the front side in the rotation direction of the rotor 5, has a shape with a low front portion inclining toward the front side in the rotation direction of the rotor 5 and faces the outside in the radial direction with respect to the radial direction of the rotor 5 (hereinafter, described as "obliquely outward-directed" in some cases) (particularly, see FIGS. 6 and 7A to 7C).

That is, because the rod-like scraping blades 9 are provided in a state of inclining as described above, the middle portion 9M in each of the scraping blades 9 that is exposed to the first introduction chamber 13 is positioned on the farther outside in the radial direction of the rotor 5 compared to the tip portion 9T fitted into the ring-like groove 10. Furthermore, the radiation surface 9m of the middle portion 9M facing the front side in the rotation direction has a shape with a low front part inclining toward the front side in the rotation direction of the rotor 5 and inclines with respect to the radial direction of the rotor 5 in the obliquely outward-directed state. Accordingly, the premix Fp scrapped out of the ring-like groove 10 by the tip portion 9T of the scraping blades 9 is guided by the radiation surface 9m of the middle portion 9M of the scraping blades 9 such that the premix Fp flows toward the outside in the radial direction of the rotor 5 within the first introduction chamber 13.

As shown in FIGS. 6, 7A, and 7B, the tip portion 9T of each of the scraping blades 9 is approximately in the form of a pyramid having an approximately rectangular cross-sectional shape. The tip portion 9T is constituted with an arc shape such that, when seen in the axial direction of the rotor 5 (when seen in a direction penetrating the page on which FIG. 7A is shown), among four lateral surfaces, an outward-directed lateral surface 9o facing the outside in the radial direction of the rotor 5 extends along an inward-directed inner surface facing the inside in the radial direction on the inner surface of the ring-like groove 10, and an inward-directed lateral surface 9i facing the inside in the radial direction of the rotor 5 extends along the outward-directed inner surface facing the outside in the radial direction on the inner surface of the ring-like groove 10.

Among four lateral surfaces of the pyramidal tip portion 9T, a scrapping surface 9f facing the front side in the rotation direction of the rotor 5 is constituted such that the scrapping surface 9f has a shape with a low front part inclining toward the front side in the rotation direction of the rotor 5 and faces the outside in the radial direction with respect to the radial direction of the rotor 5 (hereinafter, described as "obliquely outward-directed" in some cases).

As a result, due to the scrapping surface 9f of the tip portion 9T of each of the scraping blades 9, the premix Fp scrapped out of the ring-like groove 10 by the tip portion 9T of each of the scraping blades 9 is discharged into the first introduction chamber 13 toward the outside in the radial direction of the rotor 5.

A tip surface 9t of the tip portion 9T of each of the scraping blades 9 is constituted such that the tip portion 9T is parallel to the bottom surface of the ring-like groove 10 in a state of being fitted into the ring-like groove 10.

In a case where the rotor 5 is driven to rotate in a direction in which the tip of each of the scraping blades 9 becomes the front side when seen in the axial direction of the rotor 5 (when seen in a direction penetrating the page on which FIG. 7A is shown), in each of the base portion 9B, the middle portion 9M, and the tip portion 9T of each of the scraping blades 9, a surface (rear surface) 9a that becomes the rear side in the rotation direction is formed. The rear surface 9a is constituted such that so-called cavitation (local boiling) occurs by the rotation of the scraping blades 9.

The four scraping blades 9 constituted with the shapes described above incline as described above and are arrayed in the circumferential direction at an interval of about 90° as a central angle. In this state, the scraping blades 9 are fixed to the ring-like flat plate portion 15c of the divider 15 by the base portion 9B.

As shown in FIG. 4, the divider 15 provided with the scraping blades 9 is mounted on the mounting portion 5a on the front surface of the rotor 5 in a state of being spaced apart from the front surface of the rotor 5 by the interval maintaining members 20. In a state where the cylindrical sliding portion 15a of the divider 15 is fitted into the second supply portion 17 so as to rotatably slide on the second supply portion 17, the rotor 5 is disposed in the casing 1.

As a result, a constitution is obtained in which between the protruding front surface of the rotor 5 and the rear surface of the divider 15, the tapered second introduction chamber 14 whose diameter is reduced toward the front wall portion 2 side of the casing 1 is formed, and the second supply portion 17 communicates with the second introduction chamber 14 through the cylindrical sliding portion 15a of the divider 15.

Furthermore, between the front wall portion 2 of the casing 1 and the front surface of the divider 15, the ring-like first introduction chamber 13 communicating with the first supply portion 11 is formed.

In a case where the rotor 5 is driven to rotate, the cylindrical sliding portion 15a slides on the second supply portion 17, and in this state, the divider 15 rotates together with the rotor 5. In this constitution, even in a state where the rotor 5 and the divider 15 rotate, the second supply portion 17 keeps communicating with the second introduction chamber 14 through the cylindrical sliding portion 15a of the divider 15.

Recirculation Mechanism Portion

The recirculation mechanism portion (example of a separation portion) 70 is constituted such that a solution is separated by specific gravity in the cylindrical container 71. As shown in FIG. 1, the recirculation mechanism portion 70 has a constitution in which from the slurry F supplied through the discharge path 18 from the discharge portion 12 of the dispersing and mixing pump Y, the non-dispersed slurry Fr, which is likely to contain the powder P incompletely dispersed or mixed is separated to the circulation flow path 16, and the slurry F, in which the powder P is substantially completely dispersed and mixed, is separated to the discharge path 22 together with the bubbles contained in the slurry F. Each of the discharge path 18 and the circulation flow path 16 is connected to the lower portion of the cylindrical container 71, and the discharge path 22 is connected to the storage and mixing tank 51 from a discharge portion 73 formed in the upper portion of the cylindrical container 71.

As shown in FIG. 8, the recirculation mechanism portion 70 is constituted with an introduction pipe 72 which is connected to the discharge path 18 and protrudes from the bottom surface of the cylindrical container 71 toward the interior, the discharge portion 73 which is connected to the discharge path 22 in the upper portion of the cylindrical container 71, a circulation portion 74 which is in the lower portion of the portion 70 and connected to the circulation flow path 16, and a twisted plate 75 which is disposed at the upper discharge end of the introduction pipe 72 and swirls the slurry F discharged from the introduction pipe 72. By this constitution, in a state where the bubbles of the solvent R are separated from the slurry F, and the bubbles of the solvent R are separated from the non-dispersed slurry Fr circulating and supplied into the circulation flow path 16, the slurries can be supplied into the second introduction chamber 14.

Control Portion

A control portion included in the dispersing and mixing apparatus 100 is not shown in the drawing. The control portion is composed of a known arithmetic processing unit including CPU, a storage portion, and the like, and is constituted so as to be able to control the operation of the devices such as the quantitative supply device X, the dispersing and mixing pump Y, and the solvent supply portion 50 constituting the dispersing and mixing apparatus 100.

Particularly, the control portion is constituted so as to be able to control the circumferential speed of the rotary blades 6 (rotation speed of the rotor 5). In this constitution, by setting the circumferential speed of the rotary blades 6 (rotation speed of the rotor 5) such that the internal pressure of the first introduction chamber 13 and the second introduction chamber 14 becomes a predetermined negative pressure, and by rotating the rotary blades 6 at the set circumferential speed (rotation speed of the rotor 5), the control portion can make the region in the blade chamber 8, to which the slurry reaches immediately after passing through the through holes 7a of the stator 7 on the first introduction chamber 13 side and the through holes 7b of the stator 7 on the second introduction chamber 14 side, as a microbubble region (region where bubbles occur by cavitation (local boiling)) where a number of microbubbles of the solvent R occur in series all around the interior of the blade chamber 8.

Herein, for measuring the internal pressure of the first introduction chamber 13 and the second introduction chamber 14 (in the present embodiment, the internal pressure of the first introduction chamber 13 (in a state where the shutter valve 46 is closed, the internal pressure of the first introduction chamber 13 is substantially the same as that of the second introduction chamber 14)), a pressure gauge 80 is provided.

Operation of Dispersing and Mixing Apparatus

Next, the operation of the dispersing and mixing apparatus 100 will be described.

First, the quantitative supply device X is stopped, and the shutter valve 46 is closed such that the aspiration of the powder P through the powder discharge pipe 45 is stopped. In this state, while only the solvent R is being supplied from the storage and mixing tank 51 of the solvent supply portion 50, the rotor 5 is rotated, and the operation of the dispersing and mixing pump Y is started. When the internal pressure of the dispersing and mixing pump Y becomes negative after the pump is operated for a predetermined of time, the shutter valve 46 is opened. In this way, the internal pressure of the expansion chamber 47 of the quantitative supply device X becomes a negative pressure, and the internal pressure of the introduction portion 41 and the pressure in the vicinity of the lower opening portion 31b of the hopper 31 are in between the negative pressure and the atmospheric pressure.

Then, the quantitative supply device X is operated, such that the powder P stored in the hopper 31 is continuously quantitatively supplied by a predetermined amount to the mixing member 61 of the mixing mechanism 60 from the lower opening portion 31b of the hopper 31 through the expansion chamber 47 of the quantitative supply portion 40 by using stirring action of the stirring blade 32A and the negative-pressure aspiration force of the dispersing and mixing pump Y. In addition, the delivery pump 52P of the solvent supply portion 50 is operated, such that the solvent R is continuously quantitatively supplied by a predetermined amount to the mixing member 61 of the mixing mechanism 60 by using the negative-pressure aspiration force of the dispersing and mixing pump Y.

From the mixing member 61 of the mixing mechanism 60, the powder P is supplied to the first supply portion 11 through the cylindrical portion 62 of the mixing member 61, and the solvent R is supplied to the first supply portion 11 while swirling in the form of a hollow cylinder without discontinuity through the ring-like slit 63. By the first supply portion 11, the powder P and the solvent R are premixed together, and the premix Fp is introduced into the ring-like groove 10.

In a case where the rotor 5 is driven to rotate, and the divider 15 rotates together with the rotor 5, the scraping blades 9 coaxially provided on the divider 15 circle in a state where the tip portion 9T is fitted into the ring-like groove 10.

As a result, as shown in FIGS. 4 and 5 by the solid arrow, the premix Fp flows in the first supply portion 11 and then is introduced into the ring-like groove 10 is scrapped by the tip portion 9T of each of the scraping blades 9 circling in a state of being fitted into the ring-like groove 10. Briefly, in the first introduction chamber 13, the scrapped premix Fp flows in the rotation direction of the rotor 5 along the front surface of the funnel-like portion 15b and the front surface of the ring-like flat plate portion 15c in the divider 15. Then, the premix Fp passes through the through holes 7a of the stator 7 on the first introduction chamber 13 side, flows into the blade chamber 8, flows in the blade chamber 8 in the rotation direction of the rotor 5, and is discharged from the discharge portion 12.

When being scrapped by the tip portion 9T of the scraping blades 9, the premix Fp introduced into the ring-like groove 10 is affected by the shearing action. In this case, the shearing action is performed between the outward-directed lateral surface 9o of the tip portion 9T of each of the scraping blades 9 and the inward-directed inner surface of the ring-like groove 10 and between the inward-directed lateral surface 9i of the tip portion 9T of each of the scraping blades 9 and the outward-directed inner surface of the ring-like groove 10. In addition, by the rotation of the scraping blades 9, so-called cavitation (local boiling) occurs on the rear surface 9a of each of the scraping blades 9 on the rear surface side in the rotation direction. Furthermore, when the premix Fp passes through the through holes 7a of the stator 7 on the first introduction chamber 13 side, the shearing action is performed.

That is, because the shearing force can be applied to the premix Fp in the first introduction chamber 13, and the local boiling can occur, the scrapped premix Fp is mixed by being affected by the shearing action from the scraping blades 9 and the through holes 7a on the first introduction chamber 13 side. Furthermore, due to the cavitation (local boiling) that occurs on the rear surface 9a of each of the scraping blades 9, the powder P is dispersed better in the solvent R. Accordingly, the premix Fp obtained as above can be supplied, and the powder P is expected to be excellently dispersed in the solvent R in the blade chamber 8.

The slurry F discharged from the discharge portion 12 is supplied to the recirculation mechanism portion 70 through the discharge path 18. In the recirculation mechanism portion 70, the slurry F is separated into the non-dispersed slurry Fr containing the powder P which is incompletely dispersed and mixed and the slurry F in which the powder P is substantially completely dispersed and mixed, and the bubbles of the solvent R are separated. Through the circulation flow path 16 including the circulation pump 16P rotated and driven by the pump driving motor M4 in the middle of the path, the non-dispersed slurry Fr is supplied again to the second supply portion 17 of the dispersing and mixing pump Y, and the slurry F is supplied to the storage and mixing tank 51 through the discharge path 22.

The non-dispersed slurry Fr is supplied into the second introduction chamber 14 in a state where the flow rate of the slurry is restricted through the restriction portion 14a of the second supply portion 17. In the second introduction chamber 14, by being affected by the shearing action due to the plurality of rotating stirring blades 21, the non-dispersed slurry Fr is more finely disintegrated. In addition, when passing through the through holes 7b on the second introduction chamber 14 side, the non-dispersed slurry Fr is also disintegrated by being affected by the shearing action. At this time, the non-dispersed slurry Fr is introduced into the blade chamber 8 in a state where the flow rate of the slurry is restricted through the through holes 7b on the second introduction chamber 14 side. In the blade chamber 8, the non-dispersed slurry Fr is disintegrated by being affected by the shearing action due to the rotary blades 6 that rotate at a high speed. As a result, the slurry F in which the aggregate (lump) of the powder P is further reduced is mixed with the slurry F from the first introduction chamber 13, and discharged from the discharge portion 12.

Herein, the control portion is constituted so as to able to control the circumferential speed of the rotary blades 6 (rotation speed of the rotor 5). In this constitution, by setting the circumferential speed of the rotary blades 6 (rotation speed of the rotor 5) such that the internal pressure of the first introduction chamber 13 and the second introduction chamber 14 becomes a predetermined negative pressure, and by rotating the rotary blades 6 at the set circumferential speed (rotation speed of the rotor 5), the control portion can make at least the region in the blade chamber 8, to which the slurry reaches immediately after passing through the through holes 7a of the stator 7 on the first introduction chamber 13 side and the through holes 7b of the stator 7 on the second introduction chamber 14 side, as a microbubble region (region where bubbles occur by cavitation (local boiling)) where a number of microbubbles of the solvent R occur in series all around the interior of the blade chamber 8.

In this way, the solvent R permeating the aggregate (so-called lump) of the powder P foams all around the interior of the blade chamber 8, and hence the disintegration of the aggregate is accelerated. In addition, due to the force of impact that occurs when the generated microbubbles are pressurized and disappear in the blade chamber 8, the dispersion of the powder P is further accelerated. As a result, it is possible to generate a high-quality slurry F in which the powder P is excellently dispersed in the solvent R substantially in the entirety of the slurry F present all around the interior of the blade chamber 8.

In a case where the supply of the powder P by a predetermined amount from the hopper 31 of the quantitative supply device X is finished, the quantitative supply device X is stopped, and the shutter valve 46 disposed in the powder discharge pipe 45 is closed such that the aspiration of the powder P through the powder discharge pipe 45 is stopped.

In this way, it is possible to prevent the interior of the powder discharge pipe 45 on the upstream side of the shutter valve 46 from being wetted and clogged while the powder P is not being supplied, and to prevent the air from being aspirated from the first supply portion 11 of the dispersing and mixing pump Y.

In this state, the dispersing and mixing pump Y is continuously operated for a predetermined time.

At this time, from the storage and mixing tank 51 of the solvent supply portion 50, the solvent R and the substituted slurry F are supplied.

While the powder P is not being supplied, the air is not aspirated from the first supply portion 11. Therefore, a degree of vacuum in the dispersing and mixing pump Y, that is, a degree of vacuum in the first introduction chamber 13 and the second introduction chamber 14 (herein, in a state where the shutter valve 46 is closed, the internal pressure of the first introduction chamber 13 is substantially the same as that of the second introduction chamber 14) increases. Consequently, by rotating the rotary blades 6 at the set circumferential speed (rotation speed of the rotor 5), the region in the blade chamber 8, to which the slurry reaches immediately after passing through the through holes 7a of the stator 7 on the first introduction chamber 13 side and the through holes 7b of the stator 7 on the second introduction chamber 14 side, can be formed as a microbubble region (region where bubbles occur by cavitation (local boiling)) where a number of microbubbles of the solvent R occur in series all around the interior of the blade chamber 8.

As a result, the solvent R penetrating the aggregate (so-called lump or clot) of the powder P foams all around the interior of the blade chamber 8, and hence the disintegration of the aggregate is accelerated. Furthermore, due to the force of impact that occurs when the generated microbubbles are pressurized and disappear in the blade chamber 8, the dispersion of the powder P is further accelerated. Consequently, it is possible to more reliably generate a high-quality slurry F in which the powder P is excellently dispersed in the solvent R substantially in the entirety of the slurry F present all around the interior of the blade chamber 8.

The generated high-quality slurry F is stored in the storage and mixing tank 51.

Thereafter, the operation of the dispersing and mixing pump Y is stopped.

Manufacturing of Slurry

Next, a method for manufacturing a slurry by using the dispersing and mixing apparatus 100 including the dispersing and mixing pump Y will be described.

The method for manufacturing a slurry is a method for manufacturing a carbon-containing slurry, which includes a step of dispersing and mixing solid contents by using a liquid containing active materials as a solid content, specifically, by using an active material, which is a slurry material used for manufacturing an electrode for a nonaqueous electrolyte secondary battery and traps and releases alkali metal ions, a carbon-based conductive auxiliary agent, and an aqueous binder as the powder P (solid contents) and water as the solvent R and by applying a shearing force to the liquid. The shearing force is applied under a negative pressure within a range of −0.025 to −0.10 MPa.

The aforementioned negative pressure refers to the internal pressure of the first introduction chamber 13 and the second introduction chamber 14 measured by the pressure gauge 80 (in the present embodiment, the negative pressure refers to the internal pressure of the first introduction chamber 13 (herein, in a state where the shutter valve 46 is closed, the internal pressure of the first introduction chamber 13 is substantially the same as that of the second introduction chamber 14)).

That is, in the present embodiment, while the dispersing and mixing pump Y is being operated (while the powder P is not being supplied) in a state where the quantitative supply device X is stopped and the shutter valve 46 disposed in the powder discharge pipe 45 is closed such that the aspiration of the powder P through the powder discharge pipe 45 is stopped, in order for the internal pressure of the first introduction chamber 13 and the second introduction chamber 14 to be a negative pressure within a range of −0.01 to −0.10 MPa, preferably within a range of −0.03 to −0.09 MPa, and more preferably within a range of −0.04 to −0.08 MPa, the circumferential speed of the rotary blades 6 (rotation speed of the rotor 5) of the dispersing and mixing pump Y is set to be 6 to 80 m/s and preferably set to be 15 to 50 m/s.

In this way, all around the interior of the blade chamber 8, the solvent R permeating the aggregate (so-called lump or clot) of the powder P foams, and hence the disintegration of the aggregate is accelerated. Furthermore, due to the force of impact that occurs when the generated microbubbles are pressurized and disappear in the blade chamber 8, the dispersion of the powder P is further accelerated. Consequently, it is possible to more reliably generate a high-quality slurry F in which the powder P is excellently dispersed in the solvent R substantially in the entirety of the slurry F present all around the interior of the blade chamber 8. That is, immediately after the bubbles (cavities) of the cavitation that occurs under a negative pressure pass through the through holes 7b of the stator 7 on the second introduction chamber 14 side, the bubbles are more finely pulverized by the rotary blades 6 that rotate at a high speed in the blade chamber 8. As a result, the slurry F becomes foamy, the powder P in the aggregated state is disintegrated, and the dispersion of the powder P is accelerated.

Then, while being disintegrated by being affected by the shearing action due to the rotary blades 6 that rotate at a high speed in the blade chamber 8, the foamy slurry F moves to the outer peripheral portion of the blade chamber 8 due to the centrifugal force and is discharged from the discharge portion 12. In this process, due to the impact that occurs when the foamy slurry F restored to the liquid form, the dispersion of the aggregated powder P contained in the slurry F is further accelerated. Consequently, it is possible to generate a high-quality slurry F in which the powder P is dispersed to become primary particles.

Neutralization Treatment

Figure 9:
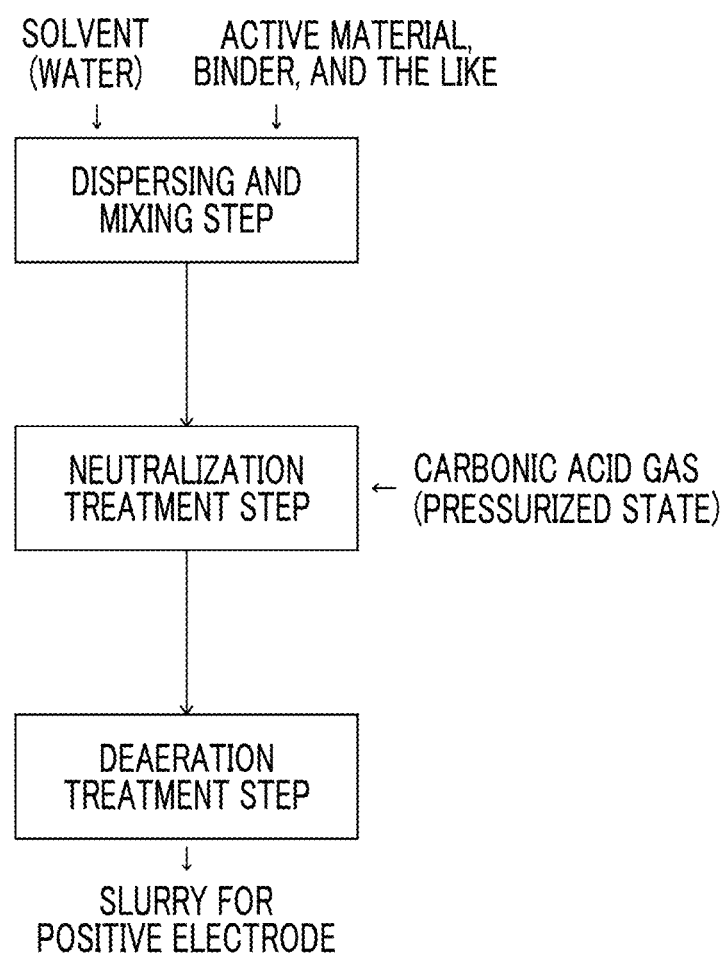
FIG. 9 is a view illustrating steps of a method for manufacturing a slurry for a positive electrode of a nonaqueous electrolyte secondary battery of the present invention.

As shown in FIG. 9 which is a view showing steps of the method for manufacturing a slurry for a positive electrode of a nonaqueous electrolyte secondary battery of the present invention, in the aforementioned dispersion treatment step, a neutralization treatment is performed on the generated slurry F stored in the storage and mixing tank 51.

In the neutralization treatment, the dispersing and mixing apparatus 100 is stopped, and a pressurized carbonic acid gas is supplied into the sealed storage and mixing tank 51 through, for example, a discharge pipe 51G for the air (gas) G. In this way, the carbonic acid gas is dissolved in the slurry F under pressure.

In this case, if necessary, the stirring mechanism 51K is driven.

By discharging the generated slurry F stored in the storage and mixing tank 51 to a tank (not shown in the drawing) provided in the exterior of the system through the discharge path 53 from the storage and mixing tank 51, sealing the tank, and supplying a pressurized carbonic acid gas into the tank, the carbonic acid gas can also be dissolved in the slurry F under pressure.

Deaeration Treatment

As shown in FIG. 9 which is a view showing steps of the method for manufacturing a slurry for a positive electrode of a nonaqueous electrolyte secondary battery of the present invention, in the aforementioned neutralization step, a deaeration treatment is performed on the slurry F that has undergone the neutralization treatment and is stored in the storage and mixing tank 51.

In the deaeration treatment, by causing cavitation by using the dispersing and mixing apparatus 100, the inorganic carbon in the slurry can be deaerated as carbonic acid gas.

In a case where the neutralization treatment is performed in the tank provided in the exterior of the system, the deaeration treatment is performed after the slurry F having undergone the neutralization treatment is sent back to the storage and mixing tank 51 through the solvent supply pipe 51R.

As in the latter part of the dispersion and mixing step, the deaeration treatment performed using the dispersing and mixing apparatus 100 is conducted in a state where the quantitative supply device X is stopped, and the shutter valve 46 disposed in the powder discharge pipe 45 is closed such that the aspiration of the powder P through the powder discharge pipe 45 is stopped.

In this state, the dispersing and mixing pump Y is continuously operated for a predetermined time.

At this time, from the storage and mixing tank 51 of the solvent supply portion 50, the slurry F which has undergone the neutralization treatment and is stored in the storage and mixing tank 51 is supplied.

While the powder P is not being supplied, the air is not aspirated from the first supply portion 11. Accordingly, a degree of vacuum in the dispersing and mixing pump Y, that is, a degree of vacuum in the first introduction chamber 13 and the second introduction chamber 14 (herein, in a state where the shutter valve 46 is closed, the internal pressure of the first introduction chamber 13 is substantially the same as that of the second introduction chamber 14) is increased. Therefore, by rotating the rotary blades 6 at the set circumferential speed (rotation speed of the rotor 5), at least the region in the blade chamber 8, to which the slurry reaches immediately after passing through the through holes 7a of the stator 7 on the first introduction chamber 13 side and the through holes 7b of the stator 7 on the second introduction chamber 14 side, is made as a microbubble region (region where bubbles occur due to cavitation (local boiling)) where a number of microbubbles of the solvent R continuously occur all around the interior of the blade chamber 8. In this way, the dispersion and mixing of the slurry F are accelerated, and due to the deaeration action in the pressure-reducing region where cavitation (local boiling) occurs, the inorganic carbon in the slurry F can be deaerated as carbonic acid gas.

As a result, all around the interior of the blade chamber 8, the solvent R permeating the aggregate (so-called lump or clot) of the powder P foams, and hence the disintegration of the aggregate is accelerated. Furthermore, due to the force of impact that occurs when the generated microbubbles are pressurized and disappear in the blade chamber 8, the dispersion of the powder P is further accelerated. Consequently, substantially the entirety of the slurry F present all around the blade chamber 8 can be generated as a high-quality slurry F in which the powder P is excellently dispersed, and the inorganic carbon in the slurry F can be deaerated as carbonic acid gas.

The carbonic acid gas eliminated and deaerated from the slurry F is introduced together with the slurry F into the storage and mixing tank 51 through the discharge path 18, the recirculation mechanism portion 70, and the discharge path 22, and discharged from the discharge pipe 51G for the air (gas) G. The slurry F having undergone the deaeration treatment is stored in the storage and mixing tank 51.

Then, the operation of the dispersing and mixing pump Y is stopped. The slurry F having undergone the deaeration treatment is supplied for the next step through the discharge path 53.

Method for Manufacturing Positive Electrode of Nonaqueous Electrolyte Secondary Battery Examples of a method for manufacturing a positive electrode of a nonaqueous electrolyte secondary battery of the present invention include a method in which a current collector is coated or filled with the neutralized slurry, and the slurry is temporarily dried and then subjected to a heat treatment so as to obtain a positive electrode.

The temporary drying is not particularly limited as long as it is performed by a method which makes it possible to remove the solvent in the slurry by volatilization. For example, the temporary drying can be performed by a method in which a heat treatment is performed in the atmosphere at a temperature of 50° C. to 400° C.

The aforementioned heat treatment can be performed by keeping the current collector with the slurry at a temperature of 50° C. to 400° C. for 0.5 to 50 hours under reduced pressure.

The current collector is not particularly limited as long as it is a material having electron conductivity, conducting electricity to a positive electrode material retained in the current collector, and having excellent oxidation resistance. For example, it is possible to use a metal or carbon such as carbon, titanium, chromium, aluminum, gold, or stainless steel and an alloy (for example, stainless steel, Anviloy steel, Hastelloy steel, or the like) containing these metals or carbon. Furthermore, a material obtained by coating the surface of the aforementioned metal with carbon may also be used.

The form of the current collector may be linear, rod-like, plate-like, foil-like, mesh-like, woven cloth, non-woven cloth, expanded, porous, or foamy. Among these, in order to obtain high energy density, an expanded or foamy current collector is preferable. In order to reduce costs, a foil-like or porous current collector is preferable.

The thickness of the active material layer of the positive electrode is preferably 0.5 to 500 μm for example, although the thickness also depends on the capacity density of the positive electrode. In a case where the thickness of the active material layer of the positive electrode is within the above range, the current collector can obtain a practical electric capacity with supporting the electrode active material.

The capacity density of the positive electrode is preferably 0.1 to 20 mAh/cm$^2$. For example, in a case where a positive electrode having a capacity density of 0.1 to 2 mAh/cm$^2$ is obtained in the present invention, the positive electrode is appropriate for being used to obtain ultrahigh output. In a case where the positive electrode has a capacity density of 0.5 to 3 mAh/cm$^2$, the positive electrode is appropriate for being used to obtain long service life or high output. In a case where the positive electrode has a capacity density of 3 to 20 mAh/cm$^2$, the positive electrode is appropriate for being used to obtain high capacity. The capacity density of a positive electrode can be measured by a charge/discharge cycle capacity test or the like, and can be determined by calculating the capacity from the mass of the active material used for coating and dividing the calculated value by an electrode area.

Nonaqueous Electrolyte Secondary Battery

The positive electrode obtained as above is bonded to a separator through a negative electrode and sealed in a state of being immersed in an electrolytic solution. In this way, a secondary battery is obtained.

As the separator, the materials used in known nonaqueous electrolyte secondary batteries are used.

The form of the separator is, for example, a microporous membrane, woven cloth, non-woven cloth, and a green compact. The material of the separator is not particularly limited, and for example, materials such as polyethylene (PE), polypropylene (PP), PTFE, PET, polyimide (PI), polyamide, polyamide-imide (PAI), aramid, polyacrylonitrile (PAN), and cellulose are preferable. Furthermore, a separator whose heat resistance is improved by coating or filling an existing separator with ceramics may also be used.

The electrolytic solution is not particularly limited as long as it is constituted with an electrolyte and a solvent thereof. Here, in a case where the nonaqueous electrolyte secondary battery is used as a lithium secondary battery, the electrolyte needs to contain lithium ions. Therefore, salts of the electrolyte are not particularly limited as long as they are used in lithium secondary batteries. For example, lithium salts are suitable. Specifically, it is possible to use at least one or more kinds of salts selected from the group consisting of lithium hexafluorophosphate, lithium perchlorate, lithium tetrafluoroborate, lithium trifluoromethanesulfonate, and lithium trifluoromethanesulfonic acid imide.

In a case where the nonaqueous electrolyte secondary battery is a sodium secondary battery or a potassium secondary battery, the lithium site in the aforementioned lithium salts may be substituted with sodium or potassium.

As the solvent of the aforementioned electrolyte, it is possible to use at least one kind of solvent selected from the group consisting of propylene carbonate (PC), ethylene carbonate (EC), dimethyl carbonate (DMC), diethyl carbonate (DEC), ethyl methyl carbonate (EMC), γ-butyrolactone, 2-methyltetrahydrofuran, 1,3-dioxolane, 4-methyl-1,3-dioxolane, 1,2-dimethoxyethane, 1,2-diethoxyethane, diethyl ether, sulfolane, methyl sulfolane, nitromethane, N,N-dimethylformamide, and dimethyl sulfoxide. Particularly, propylene carbonate, a mixture of ethylene carbonate and diethyl carbonate, or γ-butyrolactone is suitable. In the aforementioned mixture of ethylene carbonate and diethyl carbonate, a mixing ratio between ethylene carbonate and diethyl carbonate can be arbitrarily set within a range of 10 to 90 vol %.

Alternatively, a solid electrolyte without a solvent may be used.

The nonaqueous electrolyte secondary battery having the aforementioned structure functions as a secondary battery. The structure of the nonaqueous electrolyte secondary battery is not particularly limited, and can be applied to the existing battery forms-structures such as laminated batteries and wound batteries.

The secondary battery including the electrode of the present invention has excellent output characteristics or high-temperature durability. Therefore, the secondary battery can be used as a power source of various electric devices (including vehicles using electricity).

The nonaqueous electrolyte secondary battery relating to the present invention may be a lithium secondary battery, a lithium polymer battery, a solid lithium battery, a sodium secondary battery, a polymer sodium battery, a solid sodium battery, a potassium secondary battery, or the like. Among these, from the viewpoint of voltage and capacity in a single battery, a lithium secondary battery is preferable.

The nonaqueous electrolyte secondary battery of the present invention is excellent in manufacturing costs and mass productivity. Therefore, the nonaqueous electrolyte secondary battery can be used as a power source of various electric devices (including vehicles using electricity).

EXAMPLES

Hereinafter, the present invention will be more specifically described based on examples, but the present invention is not limited to the examples.
<Evaluation of Slurry>

By generating an aqueous slurry by using the aforementioned dispersing and mixing apparatus 100, performing a neutralization treatment on the slurry by adding carbonic acid gas under predetermined pressurizing conditions, and then performing a deaeration treatment, a positive electrode slurry for a test was obtained. The slurry was adjusted such that, provided that the amount of solid contents in the slurry was 100% by mass, the amount of an active material became 90% by mass, the amount of a binder became 5% by mass, and the amount of a conductive auxiliary agent became 5% by mass. The concentration of the solid contents (the active material, the binder, and the conductive auxiliary agent) in the slurry was 41% by mass.

The slurry was dispersed and mixed under the conditions of a circumferential speed of 25 m/s, a circulation time of 10 minutes, a degree of pressure reduction of −0.06 to 0.08 MPa, and a temperature of 25° C.

Examples 1 to 3 and Comparative Example 1
Preparation of Aqueous Slurry Based on Lithium-Enriched Solid Solution Slurries of Examples 1 to 3 and Comparative Example 1 were prepared using an active material based on lithium-enriched solid solution ($Li_2MnO_3$—$LiNi_{0.33}Mn_{0.33}Co_{0.33}O_2$), an acrylic acid ester as a binder, and acetylene black (AB) as a conductive auxiliary agent. In Table 1, the pH levels of the slurries, which were subjected to a neutralization treatment under each condition and in which lithium-enriched solid solution-based material was used, are compared with the pH level of the slurry not being subjected to the neutralization treatment.

TABLE 1

| | Pressurizing condition in neutralization treatment | | |
|---|---|---|---|
| | Pressure of $CO_2$ | Treatment time | pH level of slurry |
| Comparative Example 1 | — | — | 11.8 |
| Example 1 | 0.15 MPa | 5 sec | 7.2 |
| Example 2 | 0.25 MPa | 5 sec | 6.8 |
| Example 3 | 0.40 MPa | 5 sec | 6.9 |

As is evident from Table 1, it was confirmed that the pH level of the slurry (Comparative Example 1) not yet being subjected to the neutralization treatment was 11.8, and the pH levels of the slurries (Examples 1 to 3) having undergone the neutralization treatment were lower than that of Comparative Example 1.

Furthermore, it was confirmed that in a case where an aluminum foil was coated with the slurry (Comparative Example 1) not yet being subjected to the neutralization treatment, a hydrogen gas occurred; however, the slurries having undergone the neutralization treatment did not generate a hydrogen gas even though an aluminum foil was coated with the slurries, and the aluminum foil can be uniformly coated with the slurries.

It was confirmed that in a case where the slurry (Comparative Example 1) not yet being subjected to the neutralization treatment is used for coating such that an electric capacity per electrode area became equal to or greater than 2.5 mAh/cm², electrode exfoliation occurred at the time of drying, and hence a positive electrode could not be prepared; however, with the slurries (Examples 1 to 3) having undergone the neutralization treatment, a positive electrode having an electric capacity of equal to or greater than 4 mAh/cm² could be prepared.

Examples 4 to 7 and Comparative Example 2
Preparation of ($LiNi_{0.5}Co_{0.2}MnO_{0.3}O_2$)

Slurries of Examples 4 to 7 and Comparative Example 2 were prepared using a nickel-enriched ternary material ($LiNi_{0.5}Co_{0.2}Mn_{0.3}O_2$) as an active material, an acrylic acid ester as a binder, and acetylene black (AB) as a conductive auxiliary agent. In Table 2, the pH levels of the slurries, which were subjected to the neutralization treatment under each condition and in which the nickel-enriched ternary material was used, were compared with the pH level of the slurry not being subjected to the neutralization treatment.

TABLE 2

| | Pressurizing condition in neutralization treatment | | |
| --- | --- | --- | --- |
| | Pressure of $CO_2$ | Treatment time | pH level of slurry |
| Comparative Example 2 | — | — | 10.7 |
| Example 4 | 0.15 MPa | 5 sec | 9.8 |
| Example 5 | 0.25 MPa | 5 sec | 8.0 |
| Example 6 | 0.40 MPa | 5 sec | 7.3 |
| Example 7 | 0.40 MPa | 10 sec | 7.2 |

As is evident from Table 2, it was confirmed that the pH level of the slurry (Comparative Example 2) not yet being subjected to the neutralization treatment was 10.7, and the pH levels of the slurries (Examples 4 to 7) having undergone the neutralization treatment were lower than the pH level of Comparative Example 2.

Furthermore, it was confirmed that in a case where an aluminum foil was coated with the slurry (Comparative Example 2) not yet being subjected to the neutralization treatment, a hydrogen gas occurred; however, the slurries having undergone the neutralization treatment did not generate hydrogen gas even though an aluminum foil was coated with the slurries, and the aluminum foil can be uniformly coated with the slurries.

It was confirmed that in a case where the slurry (Comparative Example 2) not yet being subjected to the neutralization treatment was used for coating such that an electric capacity per electrode area became equal to or greater than 2.5 mAh/cm$^2$, electrode exfoliation occurred at the time of drying, and hence a positive electrode could not be prepared; however, with the slurries (Examples 4 to 7) having undergone the neutralization treatment, a positive electrode having an electric capacity of equal to or greater than 4 mAh/cm$^2$ could be prepared.

Examples 8 to 11 and Comparative Example 3
Preparation of Aqueous Slurry of Ternary Material ($LiNi_{0.33}Co_{0.33}Mn_{0.33}O_2$)

Slurries of Examples 8 to 11 and Comparative Example 3 were prepared using a ternary material ($LiNi_{0.33}Co_{0.33}Mn_{0.33}O_2$) as an active material, an acrylic acid ester as a binder, and acetylene black (AB) as a conductive auxiliary agent. In Table 3, the pH levels of the slurries, which were subjected to the neutralization treatment under each condition and in which the ternary material was used, are compared with the pH level of the slurry not being subjected to the neutralization treatment.

TABLE 3

| | Pressurizing condition in neutralization treatment | | |
| --- | --- | --- | --- |
| | Pressure of $CO_2$ | Treatment time | pH level of slurry |
| Comparative Example 3 | — | — | 11.4 |
| Example 8 | 0.15 MPa | 5 sec | 7.7 |
| Example 9 | 0.25 MPa | 5 sec | 6.9 |
| Example 10 | 0.40 MPa | 5 sec | 6.7 |
| Example 11 | 0.40 MPa | 10 sec | 6.8 |

As is evident from Table 3, it was confirmed that the pH level of the slurry (Comparative Example 3) not yet being subjected to the neutralization treatment was 11.4, and the pH levels of the slurries (Examples 8 to 11) having undergone the neutralization treatment were lower than the pH level of Comparative Example 3.

Furthermore, it was confirmed that in a case where an aluminum foil was coated with the slurry (Comparative Example 3) not yet being subjected to the neutralization treatment, a hydrogen gas occurred; however, the slurries having undergone the neutralization treatment did not generate a hydrogen gas even though an aluminum foil was coated with the slurries, and the aluminum foil could be uniformly coated with the slurries.

It was confirmed that in a case where the slurry (Comparative Example 3) not being subjected to the neutralization treatment is used for coating such that an electric capacity per electrode area became equal to or greater than 2.5 mAh/cm$^2$, electrode exfoliation occurred at the time of drying, and hence a positive electrode could not be prepared; however, with the slurries (Examples 8 to 11) having undergone the neutralization treatment, a positive electrode having an electric capacity of equal to or greater than 4 mAh/cm$^2$ could be prepared.

Examples 12 to 15 and Comparative Example 4
Preparation of Aqueous Slurry of Lithium Nickel-Cobalt-Aluminate ($LiNi_{0.8}Co_{0.15}Al_{0.05}O_2$)

Slurries of Examples 12 to 15 and Comparative Example 4 were prepared using lithium nickel-cobalt-aluminate ($LiNi_{0.8}Co_{0.15}Al_{0.05}O_2$) as an active material, an acrylic acid ester as a binder, and acetylene black (AB) as a conductive auxiliary agent. In Table 4, the pH levels of the slurries, which were subjected to the neutralization treatment under each condition and in which the ternary material was used, are compared with the pH level of the slurry not being subjected to the neutralization treatment.

TABLE 4

| | Pressurizing condition in neutralization treatment | | |
| --- | --- | --- | --- |
| | Pressure of $CO_2$ | Treatment time | pH level of slurry |
| Comparative Example 4 | — | — | 12.6 |
| Example 12 | 0.15 MPa | 5 sec | 10.6 |
| Example 13 | 0.25 MPa | 5 sec | 9.3 |
| Example 14 | 0.40 MPa | 5 sec | 8.0 |
| Example 15 | 0.40 MPa | 10 sec | 7.5 |

As is evident from Table 4, it was confirmed that the pH level of the slurry (Comparative Example 4) not yet being subjected to the neutralization treatment was 12.6, and the pH levels of the slurries (Examples 12 to 15) having undergone the neutralization treatment were lower than the pH level of Comparative Example 4.

Furthermore, it was confirmed that in a case where an aluminum foil was coated with the slurry (Comparative Example 4) not yet being subjected to the neutralization treatment, a hydrogen gas occurred; however, the slurries having undergone the neutralization treatment did not generate a hydrogen gas even though an aluminum foil was coated with the slurries, and the aluminum foil could be more uniformly coated with the slurries compared to Comparative Example 4.

It was confirmed that in a case where the slurry (Comparative Example 4) not yet being subjected to the neutralization treatment was used for coating such that the an electric capacity per electrode area became equal to or greater than 2.5 mAh/cm$^2$, electrode exfoliation occurred at the time of drying, and hence a positive electrode could not be prepared; however, with the slurries (Examples 12 to 15) having undergone the neutralization treatment, a positive electrode having an electric capacity of equal to or greater than 4 mAh/cm² could be prepared.

Examples 16 to 18 and Comparative Example 5 Preparation of Aqueous Slurry of Spinel-Type Lithium Manganate (LiMn$_2$O$_4$)

Slurries of Examples 16 to 18 and Comparative Example 5 were prepared using spinel-type lithium manganate (LiMn$_2$O$_4$) as an active material, an acrylic acid ester as a binder, and acetylene black (AB) as a conductive auxiliary agent. In Table 5, the pH levels of the slurries, which were subjected to the neutralization treatment under each condition and in which the spinel-type lithium manganate was used, are compared with the pH level of the slurry not being subjected to the neutralization treatment.

TABLE 5

|  | Pressurizing condition in neutralization treatment | | |
|---|---|---|---|
|  | Pressure of CO$_2$ | Treatment time | pH level of slurry |
| Comparative Example 5 | — | — | 9.0 |
| Example 16 | 0.15 MPa | 5 sec | 7.3 |
| Example 17 | 0.25 MPa | 5 sec | 8.6 |
| Example 18 | 0.40 MPa | 5 sec | 8.0 |

As is evident from Table 5, it was confirmed that the pH level of the slurry (Comparative Example 5) not yet being subjected to the neutralization treatment was 9.0, and the pH levels of the slurries (Examples 16 to 18) having undergone the neutralization treatment were lower than the pH level of Comparative Example 5.

Example 19 and Comparative Example 6 Preparation of Aqueous Slurry of Spinel-Type Lithium Manganese-Nickelate (LiMn$_{1.5}$Ni$_{0.5}$O$_4$)

Slurries of Example 19 and Comparative Example 6 were prepared using spinel-type lithium manganese-nickelate (LiMn$_{1.5}$Ni$_{0.5}$O$_4$) as an active material, an acrylic acid ester as a binder, and acetylene black (AB) as a conductive auxiliary agent. In Table 6, the pH levels of the slurries, which were subjected to the neutralization treatment under each condition and in which the spinel-type lithium manganese-nickelate was used, are compared with the pH level of the slurry not being subjected to the neutralization treatment.

TABLE 6

|  | Pressurizing condition in neutralization treatment | | |
|---|---|---|---|
|  | Pressure of CO$_2$ | Treatment time | pH level of slurry |
| Comparative Example 6 | — | — | 7.8 |
| Example 19 | 0.15 MPa | 5 sec | 6.7 |

As is evident from Table 6, it was confirmed that the pH level of the slurry (Comparative Example 6) not yet being subjected to the neutralization treatment was 7.8, and the pH level of the slurries (Example 19) having undergone the neutralization treatment was lower than the pH level of Comparative Example 6.

Examples 20 to 24 and Comparative Example 7 Preparation of Aqueous Slurry of Lithium Nickelate (LiNiO$_2$)

Slurries of Examples 20 to 24 and Comparative Example 7 were prepared using lithium nickelate (LiNiO$_2$) as an active material, an acrylic acid ester as a binder, and acetylene black (AB) as a conductive auxiliary agent. In Table 7, the pH levels of the slurries, which were subjected to the neutralization treatment under each condition and in which the lithium nickelate was used, are compared with the pH level of the slurry not being subjected to the neutralization treatment.

TABLE 7

|  | Pressurizing condition in neutralization treatment | | |
|---|---|---|---|
|  | Pressure of CO$_2$ | Treatment time | pH level of slurry |
| Comparative Example 7 | — | — | 12.8 |
| Example 20 | 0.15 MPa | 5 sec | 12.6 |
| Example 21 | 0.25 MPa | 5 sec | 11.7 |
| Example 22 | 0.40 MPa | 5 sec | 10.7 |
| Example 23 | 0.40 MPa | 10 sec | 9.4 |
| Example 24 | 0.40 MPa | 15 sec | 9.5 |

As is evident from Table 7, it was confirmed that the pH level of the slurry (Comparative Example 7) not yet being subjected to the neutralization treatment was 12.8, and the pH levels of the slurries (Examples 20 to 24) having undergone the neutralization treatment were lower than the pH level of Comparative Example 7.

Furthermore, it was confirmed that in a case where an aluminum foil was coated with the slurry (Comparative Example 7) not yet being subjected to the neutralization treatment, a hydrogen gas occurred; however, the slurries having undergone the neutralization treatment did not generate a hydrogen gas even though an aluminum foil was coated with the slurries, and the aluminum foil can be uniformly coated with the slurries compared to Comparative Example 7.

It was confirmed that in a case where the slurry (Comparative Example 7) not yet being subjected to the neutralization treatment was used for coating such that an electric capacity per electrode area became equal to or greater than 2.5 mAh/cm², electrode exfoliation occurred at the time of drying, and hence a positive electrode could not be prepared; however, with the slurries (Examples 20 to 24) having undergone the neutralization treatment, a positive electrode having an electric capacity of equal to or greater than 2.5 mAh/cm² could be prepared. Particularly, it was confirmed that with Examples 22 to 24, a positive electrode having an electric capacity of equal to or greater than 4 mAh/cm² could be prepared.

Examples 25 and 26 and Comparative Example 8 Preparation of Aqueous Slurry of Lithium Cobaltate (LiCoO$_2$)

Slurries of Examples 25 and 26 and Comparative Example 8 were prepared using lithium cobaltate (LiCoO$_2$) as an active material, an acrylic acid ester as a binder, and acetylene black (AB) as a conductive auxiliary agent. In Table 8, the pH levels of the slurries, which were subjected to the neutralization treatment under each condition and in which the lithium cobaltate was used, are compared with the pH level of the slurry not being subjected to the neutralization treatment.

TABLE 8

| | Pressurizing condition in neutralization treatment | | |
|---|---|---|---|
| | Pressure of $CO_2$ | Treatment time | pH level of slurry |
| Comparative Example 8 | — | — | 9.8 |
| Example 25 | 0.15 MPa | 5 sec | 7.2 |
| Example 26 | 0.25 MPa | 5 sec | 6.8 |

As is evident from Table 8, it was confirmed that the pH level of the slurry (Comparative Example 8) not yet being subjected to the neutralization treatment was 9.8, and the pH levels of the slurries (Examples 25 and 26) having undergone the neutralization treatment were lower than the pH level of Comparative Example 8.

Examples 27 to 29 and Comparative Example 9
Preparation of Aqueous Slurry of Lithium Iron Phosphate ($LiFePO_4$)

Slurries of Examples 27 to 29 and Comparative Example 9 were prepared using lithium iron phosphate ($LiFePO_4$) as an active material, an acrylic acid ester as a binder, and acetylene black (AB) as a conductive auxiliary agent. In Table 9, the pH levels of the slurries, which were subjected to the neutralization treatment under each condition and in which the lithium iron phosphate was used, are compared with the pH level of the slurry not being subjected to the neutralization treatment.

TABLE 9

| | Pressurizing condition in neutralization treatment | | |
|---|---|---|---|
| | Pressure of $CO_2$ | Treatment time | pH level of slurry |
| Comparative Example 9 | — | — | 9.2 |
| Example 27 | 0.15 MPa | 5 sec | 8.8 |
| Example 28 | 0.25 MPa | 5 sec | 8.5 |
| Example 29 | 0.40 MPa | 5 sec | 7.2 |

As is evident from Table 9, it was confirmed that the pH level of the slurry (Comparative Example 9) not yet being subjected to the neutralization treatment was 9.2, and the pH levels of the slurries (Examples 27 to 29) having undergone the neutralization treatment were lower than the pH level of Comparative Example 9.

Furthermore, a carbon-coated aluminum foil was coated with the slurry (Comparative Example 9) not yet being subjected to the neutralization treatment, so as to prepare an electrode having an electric capacity of equal to or greater than 3 $mAh/cm^2$ per electrode area. As a result, it was confirmed that an electrode could not be prepared because the carbon coating layer of the current collector was exfoliated, but a positive electrode having an electric capacity of equal to or greater than 3.5 $mAh/cm^2$ could be prepared using the slurry having undergone the neutralization treatment. Particularly, it was confirmed that in Example 29, a positive electrode having an electric capacity of equal to or greater than 4 $mAh/cm^2$ could be prepared.

Examples 30 to 35 and Comparative Example 10
Preparation of Aqueous Slurry of Lithium Iron Silicate ($Li_2FeSiO_4$)

Slurries of Examples 30 to 35 and Comparative Example 10 were prepared using lithium iron silicate ($Li_2FeSiO_4$) as an active material, an acrylic acid ester as a binder, and acetylene black (AB) as a conductive auxiliary agent. In Table 10, the pH levels of the slurries, which were subjected to the neutralization treatment under each condition and in which the lithium iron silicate was used, are compared with the pH level of the slurry not being subjected to the neutralization treatment.

TABLE 10

| | Pressurizing condition in neutralization treatment | | |
|---|---|---|---|
| | Pressure of $CO_2$ | Treatment time | pH level of slurry |
| Comparative Example 10 | — | — | 12.7 |
| Example 30 | 0.15 MPa | 5 sec | 12.7 |
| Example 31 | 0.25 MPa | 5 sec | 12.5 |
| Example 32 | 0.40 MPa | 5 sec | 12.4 |
| Example 33 | 0.40 MPa | 10 sec | 11.9 |
| Example 34 | 0.40 MPa | 15 sec | 10.1 |
| Example 35 | 0.40 MPa | 20 sec | 9.9 |

As is evident from Table 10, the pH level of the slurry (Comparative Example 10) not being subjected to the neutralization treatment was 12.7. It was confirmed that among the slurries having undergone the neutralization treatment, Example 30 showed no change in the pH level because the neutralization treatment was insufficient, and Examples 31 to 35 had pH levels lower than that of Comparative Example 9.

Furthermore, it was confirmed that in a case where an aluminum foil was coated with the slurry (Comparative Example 10) not yet being subjected to the neutralization treatment, a hydrogen gas occurred; however, even though an aluminum foil was coated with the slurries having undergone the neutralization treatment, a hydrogen gas occurred less, and the aluminum foil could be uniformly coated with the slurries compared to Comparative Example 10.

It was confirmed that in a case where the slurry (Comparative Example 10) not yet being subjected to the neutralization treatment is used for coating such that an electric capacity per electrode area became equal to or greater than 2.5 $mAh/cm^2$, electrode exfoliation occurred at the time of drying, and hence a positive electrode could not be prepared; however, in Examples 34 and 35, a positive electrode having an electric capacity of equal to or greater than 3.5 $mAh/cm^2$ could be prepared.

<Evaluation of Battery Characteristics>

An aluminum foil having a thickness of 20 μm was coated with a slurry having undergone a deaeration treatment, the slurry was dried, and the aluminum foil and an active material layer were then tightly bonded to each other by using a roll press machine, followed by a heat treatment (under reduced pressure, 160° C., for 12 hour or longer), thereby preparing a positive electrode for a test. The deaeration step was performed on the neutralized slurry, at a circumferential speed of 25 m/s, a circulation time of 10 minutes, a degree of pressure reduction of −0.06 to 0.08 MPa, and a temperature of 25° C. as in the dispersing and mixing step. Table 11 shows a capacity density of the positive electrode for a test. By using a metallic lithium foil, having an electric capacity 100 times or greater than that of the calculated capacity of the electrode for a test, as a counter electrode, a coin cell (CR2032) was prepared which included 1 mol/L $LiPF_6$/ethylene carbonate (EC):diethyl carbonate (DEC)=50:50 vol % as an electrolytic solution and non-woven glass cloth (manufactured by Toyo Roshi Kaisha, Ltd., #GA-100) as a separator.

The prepared cell (lithium secondary battery) for a test was charged at a cut-off voltage shown in Table 11 and at a 0.1 C rate in an environment at a temperature of 30° C. and then discharged at each rate.

TABLE 11

| Type of positive electrode | Capacity density | Cutoff voltage (vs · Li$^+$/Li) |
|---|---|---|
| Lithium-enriched solid solution-based material ($Li_2MnO_3$—$LiNi_{0.33}Mn_{0.33}Co_{0.33}O_2$) | 0.6~0.7 mAh/cm$^2$ | 2.5 V~4.3 V |
| Nickel-enriched ternary material ($LiNi_{0.5}Co_{0.2}Mn_{0.3}O_2$) | 0.7~0.8 mAh/cm$^2$ | 2.5 V~4.3 V |
| Ternary material ($LiNi_{0.33}Co_{0.33}Mn_{0.33}O_2$) | 0.8~0.9 mAh/cm$^2$ | 2.5 V~4.3 V |
| Lithium nickel-cobalt-aluminate ($LiNi_{0.8}Co_{0.15}Al_{0.05}O_2$) | 0.7~0.8 mAh/cm$^2$ | 2.5 V~4.3 V |
| Spinel-type lithium manganate ($LiMn_2O_4$) | 0.6~0.9 mAh/cm$^2$ | 3.2 V~4.3 V |
| Spinel-type lithium manganese-nickelate ($LiMn_{1.5}Ni_{0.5}O_4$) | 0.7~0.8 mAh/cm$^2$ | 3.5 V~5.0 V |
| Lithium nickelate ($LiNiO_2$) | 0.5~0.6 mAh/cm$^2$ | 2.5 V~4.3 V |
| Lithium cobaltate ($LiCoO_2$) | 0.9~1.0 mAh/cm$^2$ | 2.5 V~4.3 V |
| Lithium iron phosphate ($LiFePO_4$) | 0.9~1.0 mAh/cm$^2$ | 2.5 V~4.2 V |
| Lithium iron silicate ($Li_2FeSiO_4$) | 1.2~1.3 mAh/cm$^2$ | 1.5 V~4.5 V |

Table 12 shows the average discharge voltage of the lithium-enriched solid solution-based positive electrodes (Examples 1 to 3 and Comparative Example 1).

Table 13 shows the average discharge voltage of the nickel-enriched ternary positive electrodes (Examples 4 to 7 and Comparative Example 2).

Table 14 shows the average discharge voltage of the ternary positive electrodes (Examples 8 to 11 and Comparative Example 3).

Table 15 shows the average discharge voltage of the lithium nickel-cobalt-aluminate positive electrodes (Examples 12 to 15 and Comparative Example 4).

Table 16 shows the average discharge voltage of the spinel-type lithium manganate positive electrodes (Examples 16 to 18 and Comparative Example 5).

Table 17 shows the average discharge voltage of the spinel-type lithium manganese-nickelate positive electrodes (Example 19 and Comparative Example 6).

Table 18 shows the average discharge voltage of the lithium nickelate positive electrodes (Examples 20 to 24 and Comparative Example 7).

Table 19 shows the average discharge voltage of the lithium cobaltate positive electrodes (Examples 25 and 26 and Comparative Example 8).

Table 20 shows the average discharge voltage of the lithium iron phosphate positive electrodes (Examples 27 to 29 and Comparative Example 9).

Table 21 shows the average discharge voltage of the lithium iron silicate positive electrodes (Examples 30 to 35 and Comparative Example 10).

TABLE 12

| $Li_2MnO_3$—$LiNi_{0.33}Mn_{0.33}Co_{0.33}O_2$ | Discharge rate | | | | | |
|---|---|---|---|---|---|---|
| | 0.1 C rate | 0.2 C rate | 0.5 C rate | 1 C rate | 3 C rate | 5 C rate |
| Comparative Example 1 | 3.80 V | 3.78 V | 3.73 V | 3.65 V | 3.47 V | 3.32 V |
| Example 1 | 3.80 V | 3.78 V | 3.73 V | 3.65 V | 3.48 V | 3.34 V |
| Example 2 | 3.79 V | 3.77 V | 3.67 V | 3.54 V | 3.30 V | 3.11 V |
| Example 3 | 3.78 V | 3.75 V | 3.63 V | 3.46 V | 3.18 V | 2.96 V |

TABLE 13

| $LiNi_{0.5}Co_{0.2}Mn_{0.3}O_2$ | Discharge rate | | | | | |
|---|---|---|---|---|---|---|
| | 0.1 C rate | 0.2 C rate | 0.5 C rate | 1 C rate | 3 C rate | 5 C rate |
| Comparative Example 2 | 3.77 V | 3.75 V | 3.67 V | 3.57 V | 3.37 V | 3.22 V |
| Example 4 | 3.78 V | 3.75 V | 3.67 V | 3.55 V | 3.32 V | 3.15 V |
| Example 5 | 3.78 V | 3.76 V | 3.68 V | 3.58 V | 3.38 V | 3.48 V |
| Example 6 | 3.79 V | 3.77 V | 3.71 V | 3.64 V | 3.46 V | 3.31 V |
| Example 7 | 3.77 V | 3.74 V | 3.64 V | 3.53 V | 3.31 V | 3.14 V |

TABLE 14

| LiNi$_{0.33}$Co$_{0.33}$Mn$_{0.3}$O$_2$ | 0.1 C rate | 0.2 C rate | 0.5 C rate | 1 C rate | 3 C rate | 5 C rate |
|---|---|---|---|---|---|---|
| | | | Discharge rate | | | |
| Comparative Example 3 | 3.84 V | 3.83 V | 3.79 V | 3.75 V | 3.57 V | 3.40 V |
| Example 8 | 3.84 V | 3.83 V | 3.81 V | 3.78 V | 3.65 V | 3.49 V |
| Example 9 | 3.84 V | 3.83 V | 3.80 V | 3.76 V | 3.61 V | 3.45 V |
| Example 10 | 3.84 V | 3.83 V | 3.81 V | 3.77 V | 3.65 V | 3.49 V |
| Example 11 | 3.84 V | 3.83 V | 3.81 V | 3.77 V | 3.63 V | 3.47 V |

TABLE 15

| LiNi$_{0.8}$Co$_{0.15}$Al$_{0.05}$O$_2$ | 0.1 C rate | 0.2 C rate | 0.5 C rate | 1 C rate | 3 C rate | 5 C rate |
|---|---|---|---|---|---|---|
| | | | Discharge rate | | | |
| Comparative Example 4 | 3.72 V | 3.69 V | 3.61 V | 3.52 V | 3.26 V | 3.08 V |
| Example 12 | 3.74 V | 3.72 V | 3.65 V | 3.57 V | 3.33 V | 3.15 V |
| Example 13 | 3.74 V | 3.72 V | 3.67 V | 3.59 V | 3.38 V | 3.18 V |
| Example 14 | 3.74 V | 3.72 V | 3.66 V | 3.59 V | 3.38 V | 3.19 V |
| Example 15 | 3.74 V | 3.73 V | 3.67 V | 3.60 V | 3.41 V | 3.24 V |

TABLE 16

| LiMn$_2$O$_4$ | 0.1 C rate | 0.2 C rate | 0.5 C rate | 1 C rate | 3 C rate | 5 C rate |
|---|---|---|---|---|---|---|
| | | | Discharge rate | | | |
| Comparative Example 5 | 4.06 V | 4.05 V | 4.02 V | 3.98 V | 3.86 V | 3.79 V |
| Example 16 | 4.06 V | 4.05 V | 4.02 V | 3.99 V | 3.89 V | 3.82 V |
| Example 17 | 4.06 V | 4.05 V | 4.03 V | 4.00 V | 3.91 V | 3.84 V |
| Example 18 | 4.06 V | 4.05 V | 4.03 V | 4.01 V | 3.92 V | 3.86 V |

TABLE 17

| LiMn$_{1.5}$Ni$_{0.5}$O$_4$ | 0.1 C rate | 0.2 C rate | 0.5 C rate |
|---|---|---|---|
| | Discharge rate | | |
| Comparative Example 6 | 4.57 V | 4.41 V | 3.54 V |
| Example 19 | 4.62 V | 4.51 V | 3.94 V |

TABLE 18

| LiNiO$_2$ | 0.1 C rate | 0.2 C rate | 0.5 C rate | 1 C rate | 3 C rate |
|---|---|---|---|---|---|
| | Discharge rate | | | | |
| Comparative Example 7 | 3.46 V | 3.00 V | 2.95 V | 2.84 V | 2.79 V |
| Example 20 | 3.56 V | 3.24 V | 3.25 V | 3.12 V | 2.81 V |
| Example 21 | 3.50 V | 3.07 V | 3.12 V | 3.01 V | 2.79 V |
| Example 22 | 3.51 V | 3.17 V | 3.18 V | 3.07 V | 3.80 V |
| Example 23 | 3.77 V | 3.60 V | 3.52 V | 3.36 V | 2.85 V |
| Example 24 | 3.65 V | 3.53 V | 3.49 V | 3.34 V | 2.86 V |

TABLE 19

| LiCoO$_2$ | 0.1 C rate | 0.2 C rate | 0.5 C rate | 1 C rate |
|---|---|---|---|---|
| | Discharge rate | | | |
| Comparative Example 8 | 3.72 V | 3.55 V | 3.31 V | 2.90 V |
| Example 25 | 3.69 V | 3.55 V | 3.37 V | 2.98 V |
| Example 26 | 3.68 V | 3.52 V | 3.37 V | 2.98 V |

TABLE 20

| LiFePO$_4$ | 0.1 C rate | 0.2 C rate | 0.5 C rate | 1 C rate | 3 C rate | 5 C rate |
|---|---|---|---|---|---|---|
| | | | Discharge rate | | | |
| Comparative Example 9 | 3.38 V | 3.34 V | 3.31 V | 3.24 V | 3.02 V | 2.91 V |
| Example 27 | 3.38 V | 3.34 V | 3.32 V | 3.26 V | 3.06 V | 2.95 V |
| Example 28 | 3.36 V | 3.30 V | 3.31 V | 3.26 V | 3.08 V | 2.97 V |
| Example 29 | 3.38 V | 3.35 V | 3.32 V | 3.26 V | 3.06 V | 2.95 V |

TABLE 21

| Li$_2$FeSiO$_4$ | 0.1 C rate | 0.2 C rate | 0.5 C rate | 1 C rate | 3 C rate | 5 C rate |
|---|---|---|---|---|---|---|
| | | | Discharge rate | | | |
| Comparative Example 10 | 2.50 V | 2.48 V | 2.45 V | 2.41 V | 2.32 V | 2.44 V |
| Example 30 | 2.48 V | 2.46 V | 2.44 V | 2.41 V | 2.32 V | 2.39 V |
| Example 31 | 2.49 V | 2.47 V | 2.45 V | 2.42 V | 2.33 V | 2.37 V |
| Example 32 | 2.49 V | 2.47 V | 2.45 V | 2.41 V | 2.32 V | 2.41 V |
| Example 33 | 2.50 V | 2.48 V | 2.45 V | 2.42 V | 2.33 V | 2.38 V |
| Example 34 | 2.50 V | 2.48 V | 2.46 V | 2.42 V | 2.33 V | 2.45 V |
| Example 35 | 2.50 V | 2.47 V | 2.45 V | 2.41 V | 2.30 V | 2.32 V |

As is evident from Tables 12 to 21, even in a case where a slurry having undergone neutralization using a carbonic acid is used in the positive electrode, the battery characteristics were not greatly affected. Furthermore, the optimal carbonic acid neutralization conditions vary with the active material of the positive electrode. With the lithium-enriched solid solution-based positive electrode, Example 1 had a higher voltage compared to the comparative example. With the nickel-enriched ternary positive electrode, Examples 5 and 6 had a higher voltage compared the comparative example. With the ternary positive electrode, Examples 8 to 11 had higher voltage compared to the comparative example. With the lithium nickel-cobalt-aluminate positive electrode, Examples 12 to 15 had a higher voltage compared to the comparative example. With the spinel-type lithium manganate positive electrode, Examples 16 to 18 had a higher voltage compared to the comparative example. With the spinel-type lithium manganese-nickelate positive electrode, Example 19 had a higher voltage compared to the comparative example. With the lithium nickelate positive electrode, Examples 20 to 24 had a higher voltage compared to the comparative example. With the lithium cobaltate positive electrode, Examples 25 and 26 had a higher voltage compared to the comparative example. With the lithium iron phosphate positive electrode, Examples 27 to 29 had a higher voltage compared to the comparative example. With the lithium iron silicate positive electrode, Example 34 had a higher voltage compared to the comparative example.

Figure 10:
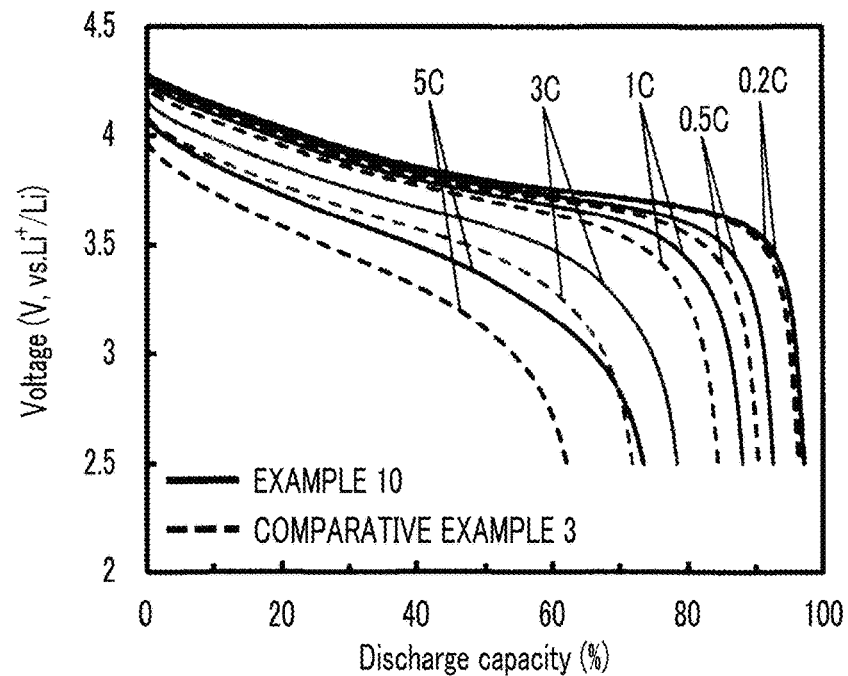
FIG. 10 is a graph in which high-rate discharge curves of Example 10 and Comparative Example 3 are compared with each other.

In FIG. 10, high rate discharge curves of Example 10 and Comparative Example 3 are compared with each other for example. It is understood that Example 10 has a discharge voltage and a discharge capacity higher than those of Comparative Example 3 and exhibits excellent output characteristics.

Figure 11:
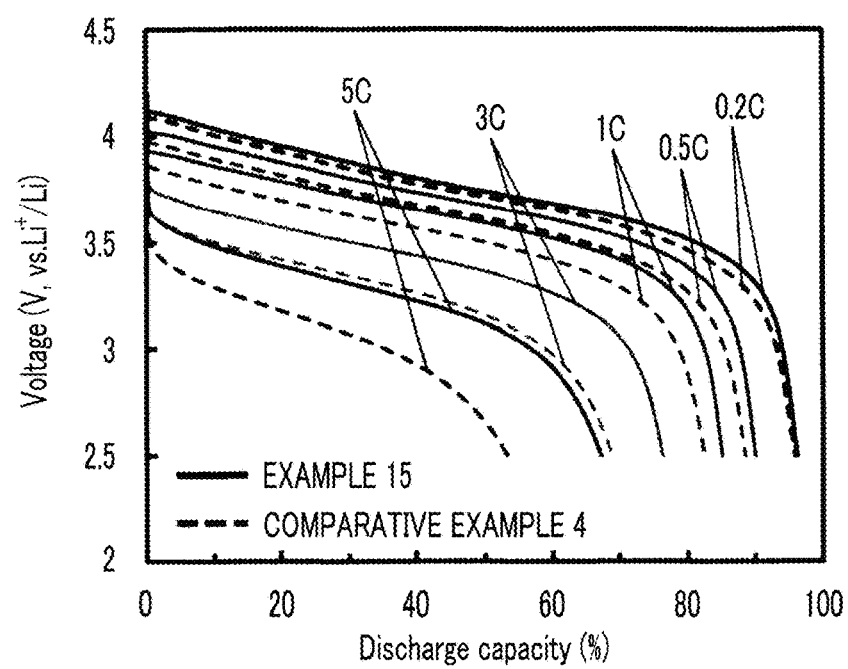
FIG. 11 is a graph in which high-rate discharge curves of Example 15 and Comparative Example 4 are compared with each other.

In FIG. 11, high rate discharge curves of Example 15 and Comparative Example 4 are compared with each other for example. It is understood that Example 15 had a discharge voltage and a discharge capacity higher than those of Comparative Example 4 and exhibits excellent output characteristics.

In the method for manufacturing a slurry for a positive electrode of a nonaqueous electrolyte secondary battery and a slurry for a positive electrode of a nonaqueous electrolyte secondary battery of the present invention, carbonic acid gas is used as a neutralizer. Accordingly, after an alkali component in the slurry containing an alkali metal complex oxide is neutralized within a short period of time, the surplus carbonic acid gas can be reliably deaerated. Therefore, it is possible to shorten the lead time of manufacturing of a positive electrode of a nonaqueous electrolyte secondary battery, which makes it possible to improve the conductivity or the battery characteristics with preventing impurities negatively affecting the battery characteristics from remaining in the interior of a battery and preventing the formation of a non-conductive layer from being formed in the interface between a current collector and an active material layer. In addition, the manufacturing method and the slurry of the present invention are expected to bring about the following operation and effect.

1. The significant reduction in the pH level resulting from the injection of an excess of acid that is added for a neutralization treatment does not occur (generally, the pH level does not decrease to become equal to or lower than 5).

2. The active material is not easily denatured.

3. At the time of the neutralization treatment, a toxic gas such as a chlorine gas or a fluorine gas does not occur, and the waste fluid does not contain a toxic substance and is close to neutral. Therefore, the slurry is safe and handled easily.

4. Carbonic acid gas can be supplied using a gas canister or carbonated water, and hence the facilities can be constituted in a simple way.

5. The salt generated by the neutralization treatment does not negatively affect the chemical reaction of a battery.

6. The positive electrode neutralized using a carbonic acid has excellent output characteristics and service life characteristics.

Hitherto, the method for manufacturing a slurry for a positive electrode of a nonaqueous electrolyte secondary battery and the slurry for a positive electrode of a nonaqueous electrolyte secondary battery of the present invention have been described based on the embodiments thereof. However, the present invention is not limited to the content described in the embodiments, and the constitution of the present invention can be appropriately modified within a scope that does not depart from the gist of the present invention.

The method for manufacturing a slurry for a positive electrode of a nonaqueous electrolyte secondary battery and the slurry for a positive electrode of a nonaqueous electrolyte secondary battery of the present invention have characteristics in which surplus carbonic acid gas can be reliably deaerated after an alkali component contained in the slurry containing an alkali metal complex oxide is neutralized within a short period of time. Therefore, the manufacturing method and the slurry of the present invention can be suitably used in the uses of a method for manufacturing a slurry for a positive electrode of a nonaqueous electrolyte secondary battery and a slurry for a positive electrode of a nonaqueous electrolyte secondary battery.

It should be understood that the invention is not limited to the above-described embodiment, but may be modified into various forms on the basis of the spirit of the invention. Additionally, the modifications are included in the scope of the invention.

What is claimed is:

1. A method for manufacturing a slurry, the method comprising:
    performing, by a dispersing and mixing apparatus, a dispersing and mixing step of dispersing and mixing a powder and a solvent to generate a preliminary slurry that comprises a positive electrode active material;
    performing, by the dispersing and mixing apparatus after the dispersing and mixing apparatus performs the dispersing and mixing step, a neutralizing step of producing a primary neutralized slurry by neutralizing the preliminary slurry; and
    performing, by the dispersing and mixing apparatus after the dispersing and mixing apparatus performs the neutralizing step, a deaerating step of producing a secondary neutralized slurry by deaerating the primary neutralized slurry,
    wherein the deaerating step comprises applying, to the primary neutralized slurry, a shearing force in a manner that causes cavitation.

2. The method according to claim 1, wherein water is used as the solvent.

3. The method according to claim 1, wherein the neutralizing step comprises adding carbonic acid gas to the preliminary slurry.

4. The method according to claim 3, wherein the carbonic acid gas in the solvent is used to generate an inorganic carbon in the solvent.

5. The method according to claim 3, wherein a pressure of the carbonic acid gas is equal to or higher than 0.12 MPa and equal to or lower than 100 MPa.

6. The method according to claim 3, wherein a pressure of the carbonic acid gas is equal to or higher than 0.2 MPa and equal to or lower than 50 MPa.

7. The method according to claim 3, wherein a pressure of the carbonic acid gas is equal to or higher than 0.3 MPa and equal to or lower than 10 MPa.

8. The method according to claim 3, wherein the deaerating step comprises causing, by the dispersing and mixing apparatus, cavitation to deaerate an inorganic carbon in the primary neutralized slurry.

9. The method according to claim 1, wherein the secondary neutralized slurry is for a positive electrode of a non-aqueous electrolyte secondary battery.

10. The method according to claim 9, wherein the non-aqueous electrolyte secondary battery comprises an alkali metal complex oxide.

11. The method according to claim 10, wherein the alkali metal complex oxide is a lithium complex oxide.

12. The method according to claim 1, wherein the preliminary slurry further comprises a binder and a conductive material.

13. The method according to claim 12, wherein with respect to a total amount of the positive electrode active material, the binder, and the conductive material:
an amount of the positive electrode active material is 60% to 99% by mass,
an amount of the binder is 0.1% to 25% by mass, and
an amount of the conductive material is 0.1% to 10% by mass.

14. The method according to claim 12, wherein with respect to a total amount of the positive electrode active material, the binder, and the conductive material:
an amount of the positive electrode active material is 80% to 95% by mass,
an amount of the binder is 0.5% to 15% by mass, and
an amount of the conductive material is 0.5% to 5% by mass.

15. The method according to claim 1, wherein the secondary neutralized slurry is recirculated to the dispersing and mixing apparatus to be used in the neutralizing step.

* * * * *